United States Patent
Morimoto et al.

(10) Patent No.: US 8,275,387 B2
(45) Date of Patent: Sep. 25, 2012

(54) MOBILE STATION, BASE STATION, COMMUNICATIONS SYSTEM, AND COMMUNICATION METHOD

(75) Inventors: Akihito Morimoto, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 895 days.

(21) Appl. No.: 12/363,821

(22) Filed: Feb. 2, 2009

(65) Prior Publication Data

US 2009/0143075 A1 Jun. 4, 2009

Related U.S. Application Data

(62) Division of application No. 11/556,425, filed on Nov. 3, 2006, now abandoned, which is a division of application No. 10/378,900, filed on Mar. 5, 2003, now Pat. No. 7,321,772.

(30) Foreign Application Priority Data

Mar. 6, 2002 (JP) ................................. 2002-061150

(51) Int. Cl.
*H04W 72/00* (2009.01)
*H04W 4/00* (2009.01)
(52) U.S. Cl. ..................... 455/453; 455/422.1
(58) Field of Classification Search .............. 455/453, 455/422.1, 452.2, 423, 446, 452.1
See application file for complete search history.

(56) References Cited

U.S. PATENT DOCUMENTS

| | | | |
|---|---|---|---|
| 4,556,760 A | 12/1985 | Goldman | |
| 5,379,446 A | 1/1995 | Murase | |
| 5,454,026 A | 9/1995 | Tanaka | |
| 6,002,715 A | 12/1999 | Brailean et al. | |
| 6,285,883 B1 | 9/2001 | Bringby et al. | |
| 6,327,472 B1 | 12/2001 | Westroos et al. | |

(Continued)

FOREIGN PATENT DOCUMENTS

CN 1 224 528 7/1987

(Continued)

OTHER PUBLICATIONS

Hiroshi Furukawa, et al., SSDT-Site Selection Diversity Transmission Power Control for CDMA Forward Link, IEEE Journal on Selected Areas in Communications, vol. 18, No. 8, Aug. 2000, pp. 1546-1554.

(Continued)

*Primary Examiner* — William Deane, Jr.
(74) *Attorney, Agent, or Firm* — Oblon, Spivak, McClelland, Maier & Neustadt, L.L.P.

(57) ABSTRACT

A mobile station comprises a reception unit configured to receive a signal transmitted from a base station; a selection unit configured to select a communication area to perform communication from a plurality of communication areas based on traffic load in the plurality of communication areas where the reception unit can receive the signal; and a notification unit configured to notify the base station of the communication area selected. Another mobile station comprises a reception unit configured to receive a signal transmitted from a base station; a calculation unit configured to calculate a ratio of an average reception quality value over a short period to an average reception quality value over a long period; and a selection unit configured to select a communication area to perform communication from a plurality of communication areas where the reception unit can receive the signal, based on the ratio.

5 Claims, 13 Drawing Sheets

U.S. PATENT DOCUMENTS

| | | | |
|---|---|---|---|
| 7,672,685 B2 * | 3/2010 | Itoh | 455/522 |
| 2002/0012385 A1 | 1/2002 | Yun et al. | |

FOREIGN PATENT DOCUMENTS

| | | |
|---|---|---|
| EP | 0 762 668 | 3/1997 |
| EP | 0 789 501 | 8/1997 |
| EP | 0 984 649 | 3/2000 |
| EP | 1 058 474 | 12/2000 |
| EP | 1 133 208 | 9/2001 |
| EP | 1 156 623 | 11/2001 |
| GB | 2 313 258 | 11/1997 |
| JP | 11-155165 | 6/1999 |
| JP | 11-275623 A | 10/1999 |
| JP | 2000-115073 A | 4/2000 |
| JP | 2000-295650 A | 10/2000 |
| JP | 2003-134550 | 5/2003 |
| KR | 2001-0114104 | 12/2001 |
| KR | 2003-0015859 | 2/2003 |
| WO | WO 91/19403 | 12/1991 |
| WO | WO 97/08847 | 3/1997 |
| WO | WO 00/28767 | 5/2000 |
| WO | WO 01/99311 | 12/2001 |

OTHER PUBLICATIONS

Paul Bender, et al., "CDMA/HDR: A Bandwidth-Efficient High-Speed Wireless Data Service for Nomadic Users," IEEE Communications Magazine, Jul. 2000. pp. 70-77.

Toyoki UE, et al., "Symbol Rate and Modulation Level-Controlled Adaptive Modulation/TDMA/TDD System for High-Bit-Rate Wireless Data Transmission," IEEE Transaction on Vehicular Technology, vol. 47, No. 4, Nov. 1998, pp. 1134-1147.

Shu Lin, et al., "Automatic-Repeat-Request Error-Control Schemes," IEEE Communications Magazine, vol. 22, No. 12, Dec. 1984, pp. 5-17.

* cited by examiner

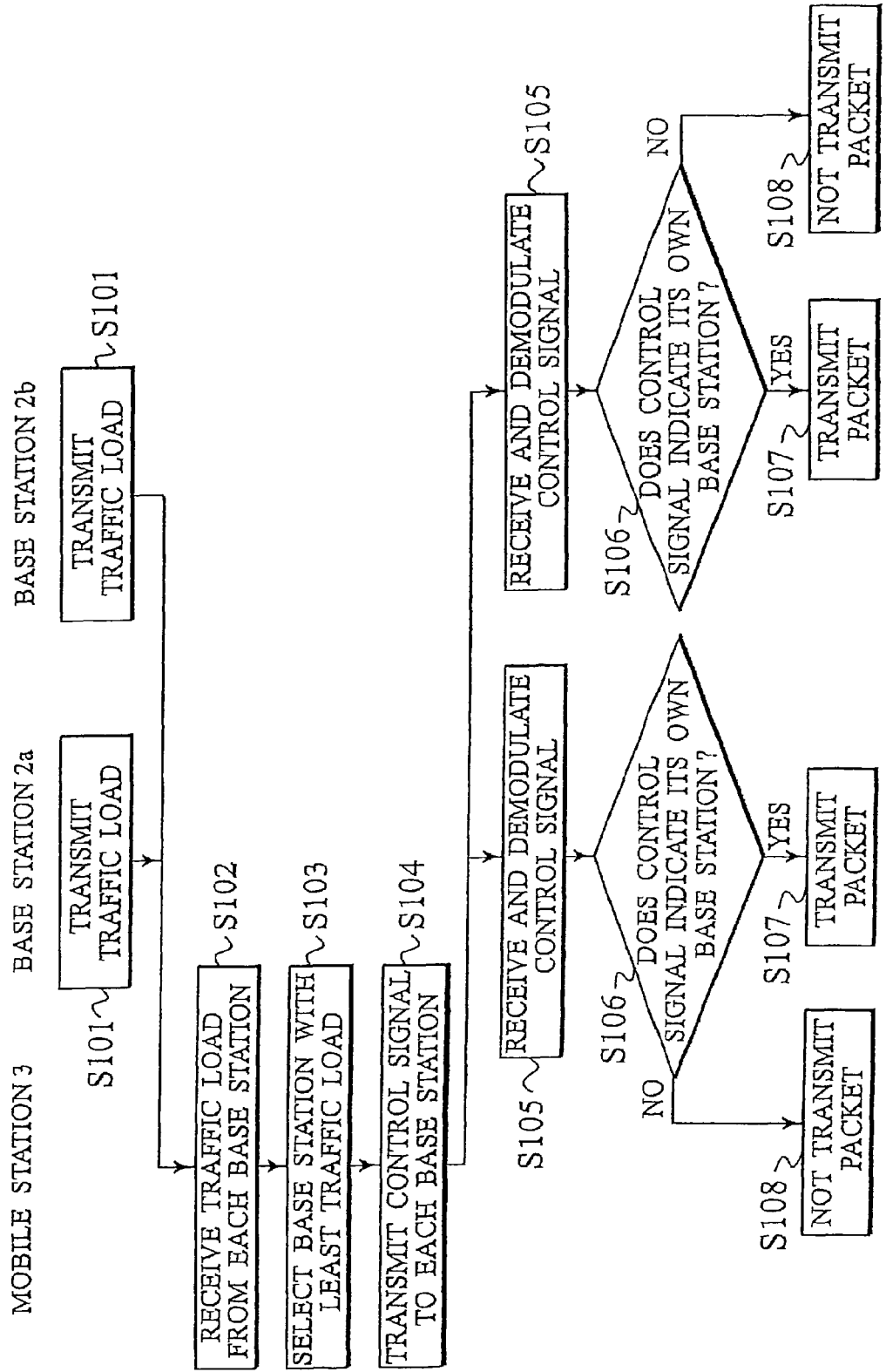

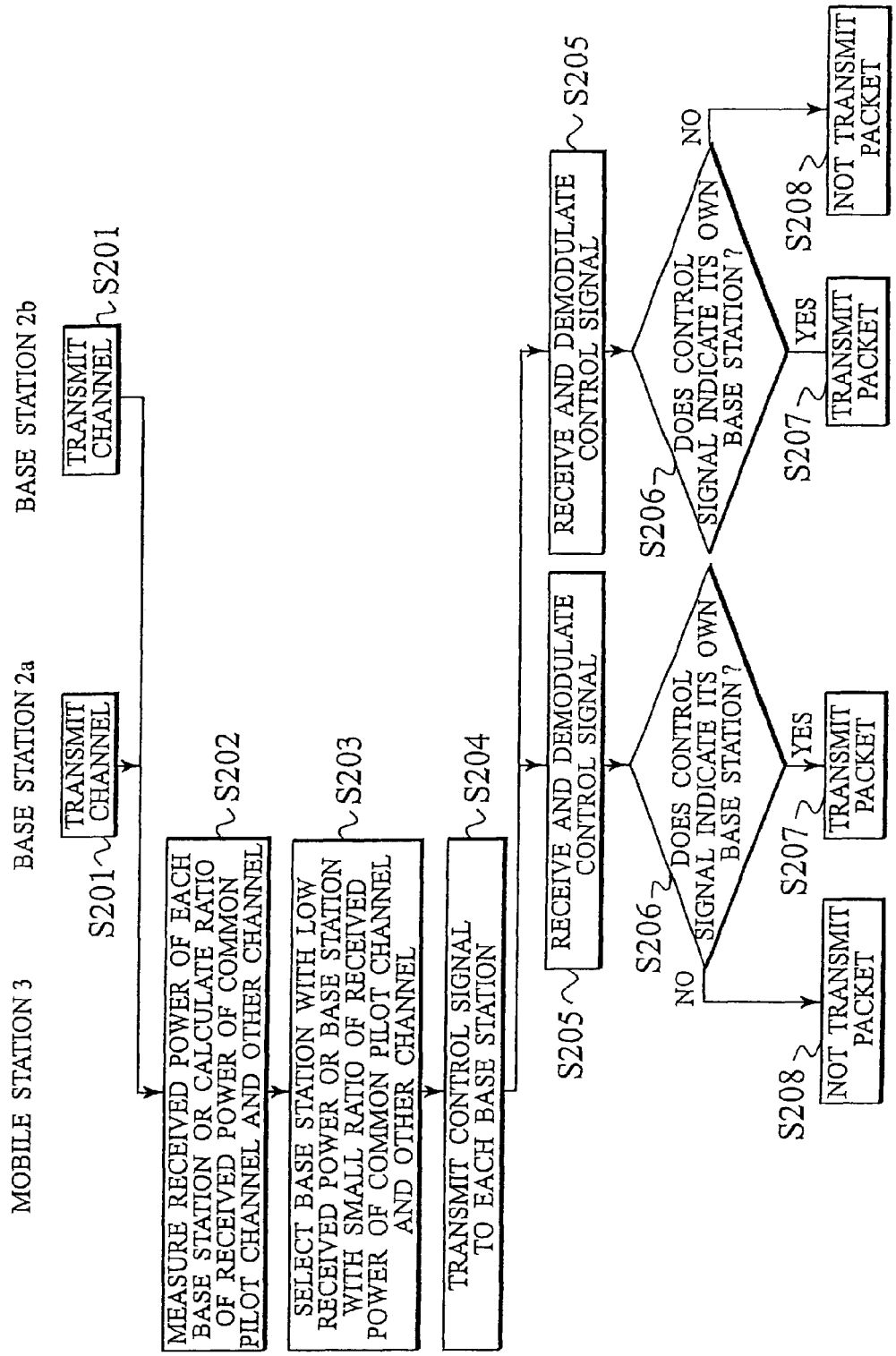

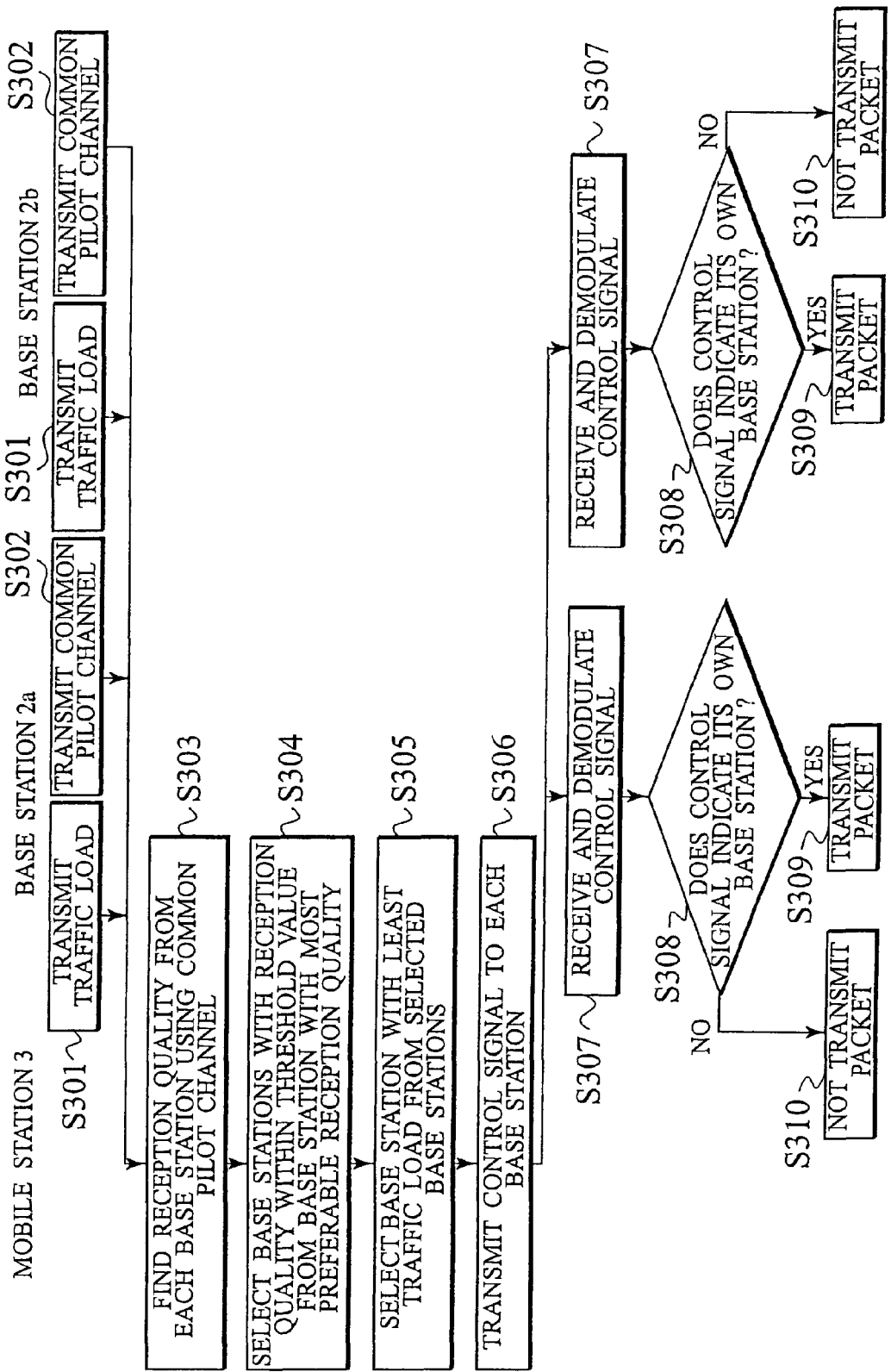

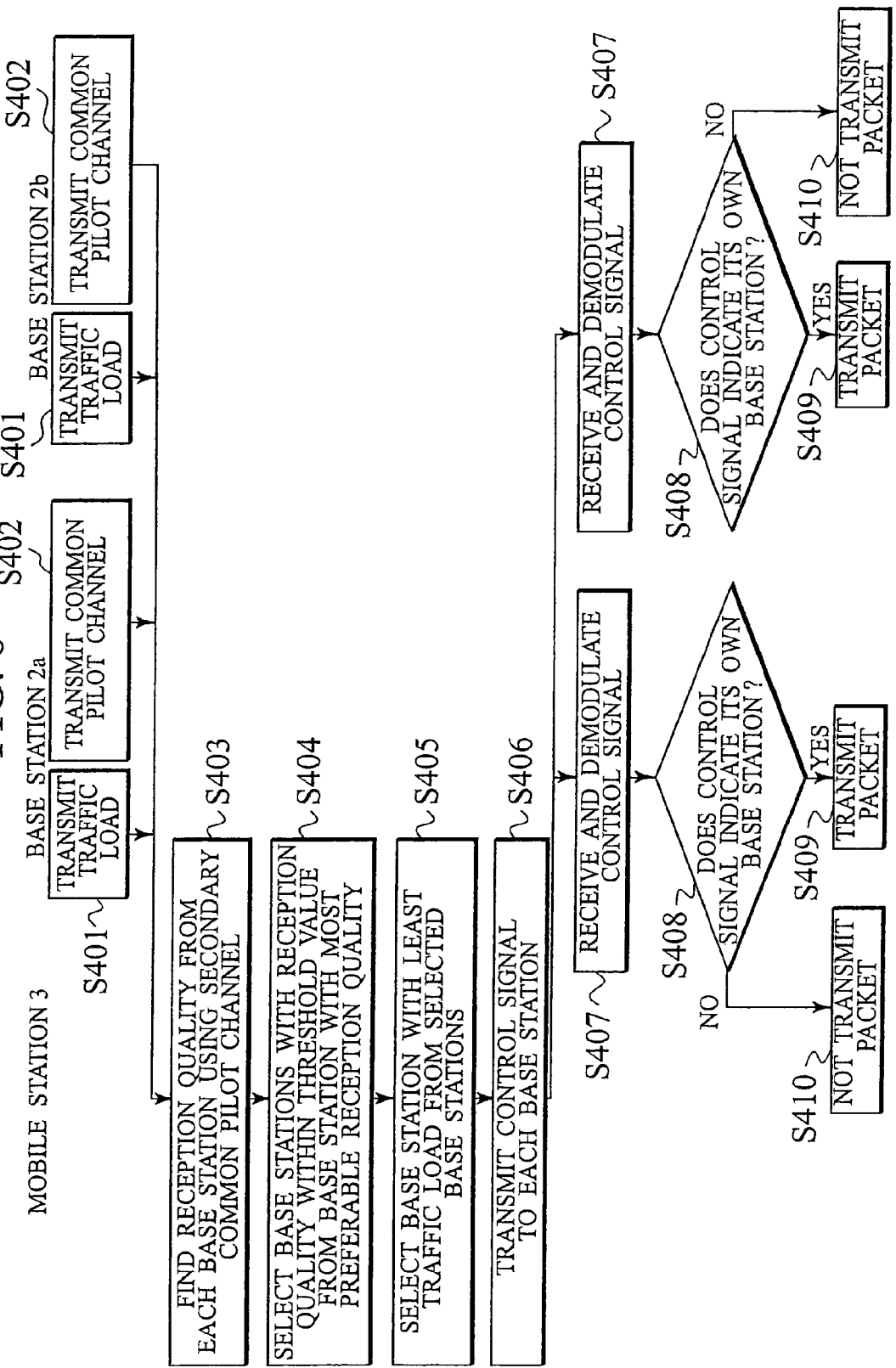

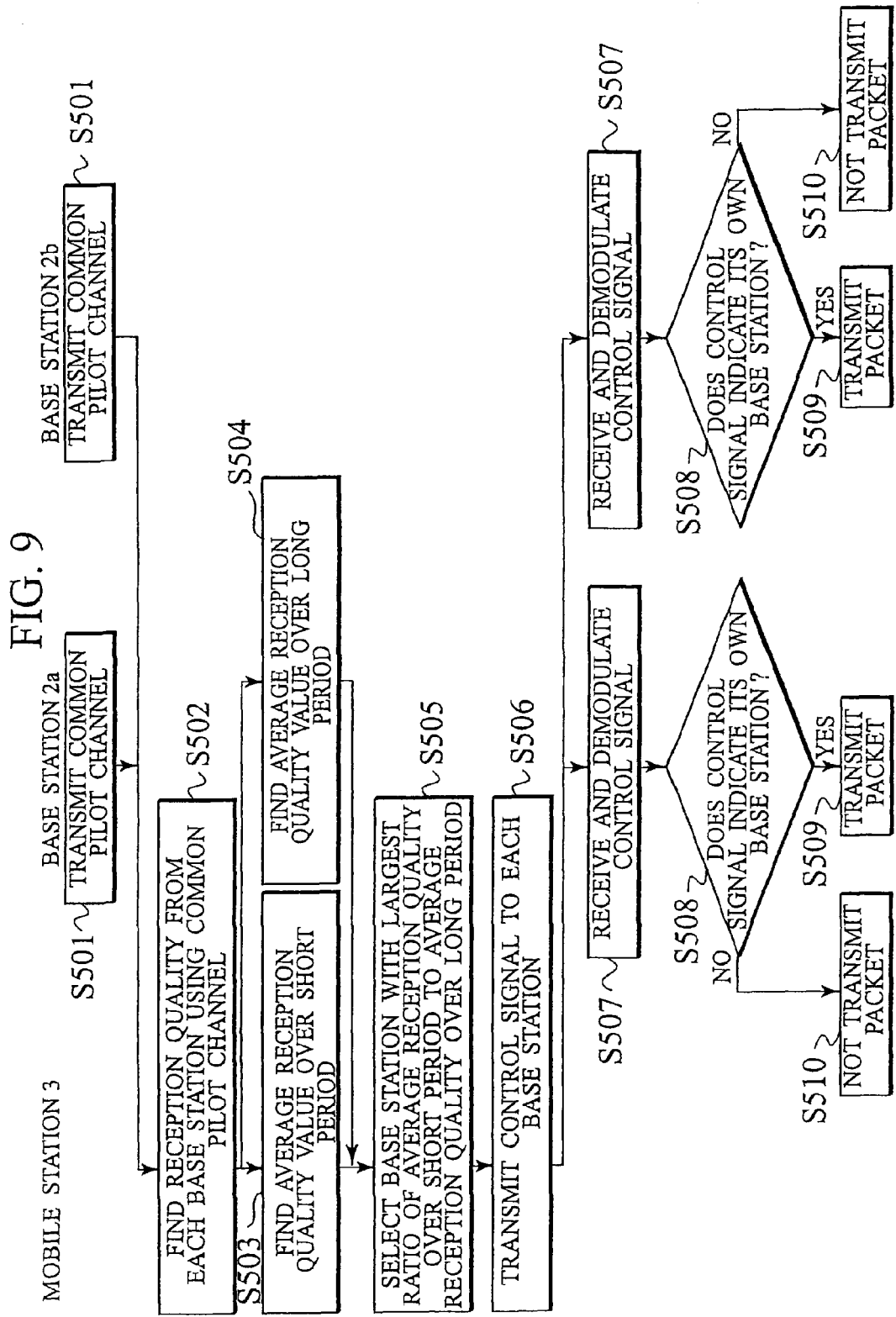

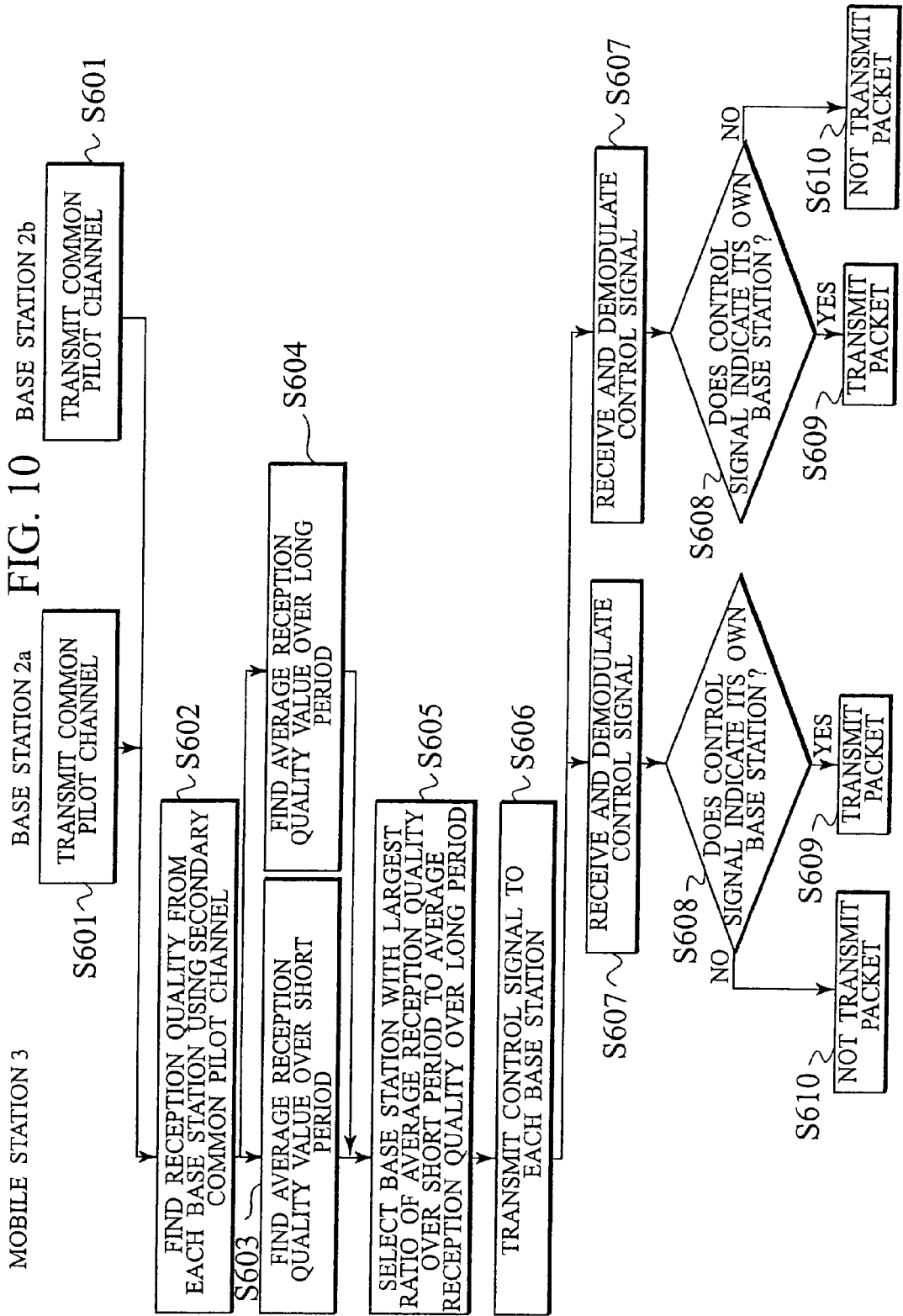

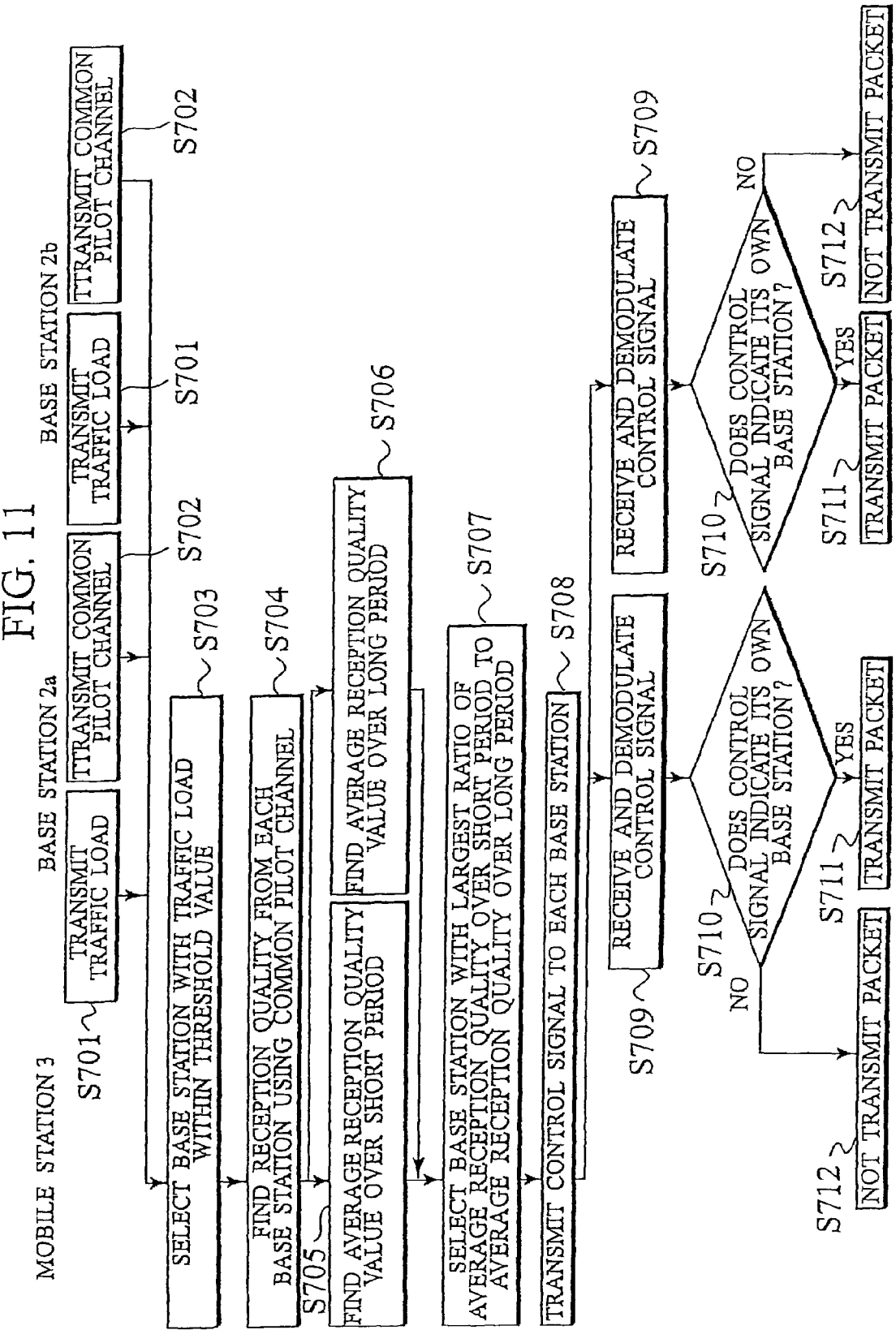

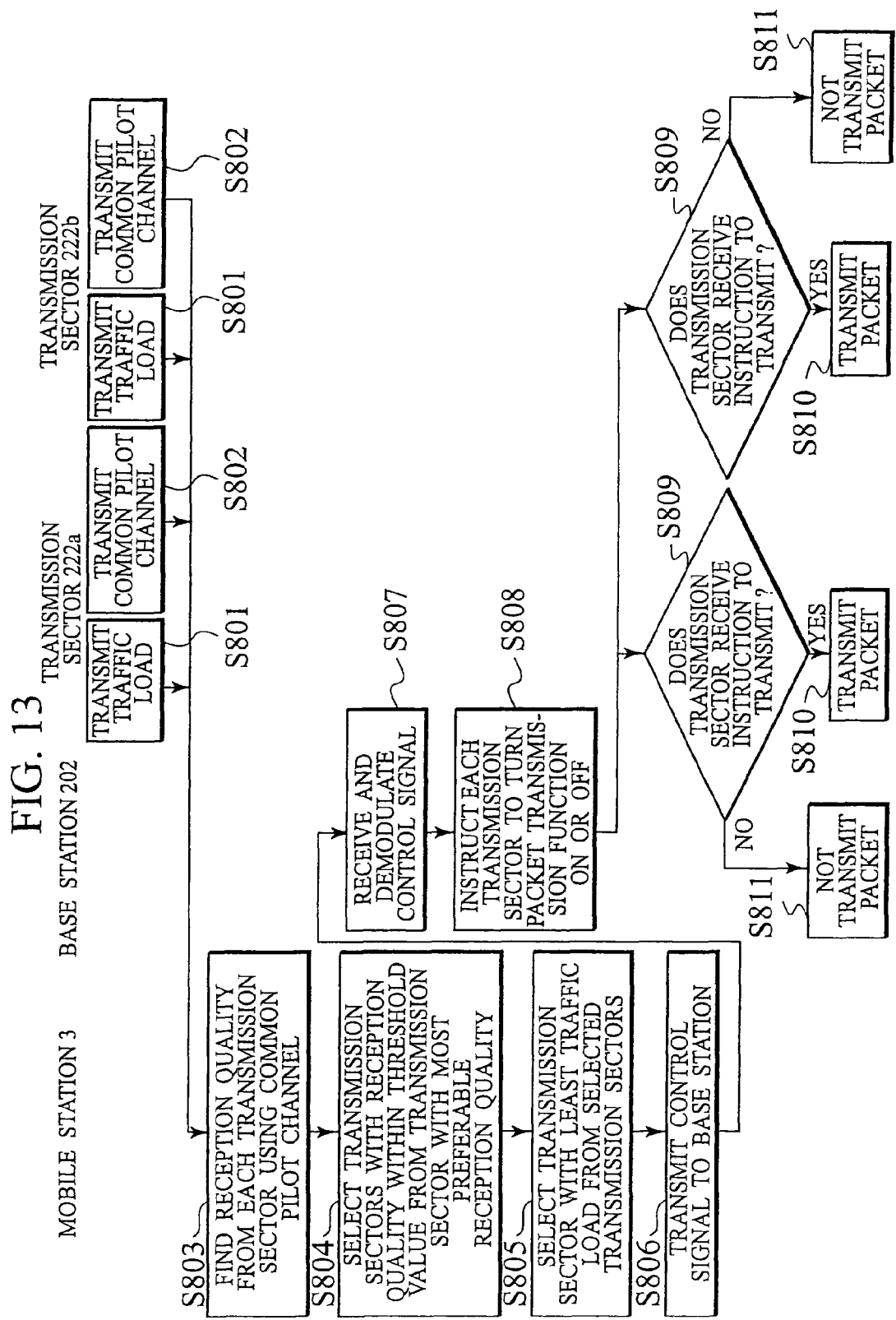

MOBILE STATION, BASE STATION, COMMUNICATIONS SYSTEM, AND COMMUNICATION METHOD

CROSS REFERENCE TO RELATED APPLICATIONS

This application is a divisional application of Ser. No. 11/556,425, filed Nov. 3, 2006, which is a divisional of U.S. Ser. No. 10/378,900, filed Mar. 5, 2003, issued as U.S. Pat. No. 7,321,772, which is based upon and claims priority to Japanese Patent Application No. P2002-61150, filed on Mar. 6, 2002; the entire contents of all of which are incorporated herein by reference.

BACKGROUND OF THE INVENTION

1. Field of the Invention

The present invention relates to a mobile station, a base station, a communication system, and a communication method.

2. Description of the Related Art

Conventionally, in a wideband-code division multiple access (W-CDMA) system, consecutive high quality communication is performed through soft handover. Soft handover refers to a mobile station transmitting/receiving a plurality of signals in a plurality of sectors or cells having different spreading codes.

Meanwhile, in the case of soft handover in a downlink, a plurality of base stations transmits dedicated physical channels of the same information. Therefore, interference increases. As a result, in a downlink, site diversity effects obtained through soft handover are less than those in an uplink. Accordingly, site selection diversity transmission power control (SSDT) method has been proposed ("SSDT-Site Selection Diversity Transmission Power Control for CDMA Forward Link", H. Furukawa, K. Hamabe, and A. Ushirokawa: IEEE Journal on selected areas in communications, vol. 18, no. 8, pp. 1546-1554, August 2000). SSDT method is a method where, among the base stations performing soft handover, only the base station with the largest received power or the largest signal to interference power ratio of a received signal (hereafter referred to as the "most appropriate base station") performs data transmission and this most appropriate base station switches to high speed mode.

Considering the rapid spread of the Internet, increases in the dimension of information, increases in the capacity of information, and the development of the next generation Internet in recent years, there is a pressing need in mobile communication systems to develop a radio access scheme capable of implementing an information transmission rate exceeding 2 Mbps. This need is considered to be increasing, especially in downlink traffic requiring high speed and a large capacity, including downloads of images, files, or moving images such as video from a database or Web site. Therefore, a high-speed packet transmission technique suitable for high speed/large capacity traffic is indispensable.

From a background such as this, a proposal has been made to implement high speed packet transmission with a maximum information transmission rate of 2.4 Mbps based on an IS-95 radio interface ("CDMA/HDR: A Bandwidth-Efficient High-Speed Wireless Data Services for Nomadic Users", P. Bender, P. Black, M. Grob, R. Padovani, N. Shindhushyana, and A. Viterbi: IEEE Communication Magazine, Vol. 38, no. 7, pp. 70-77, July 2000). Additionally, in the 3rd generation partnership project (3GPP), implementation of high-speed packet transmission having a maximum information transmission rate of approximately 10 Mbps obtained by expanding the W-CDMA radio interface has been studied.

Application of adaptive modulation and channel coding based on adaptive radio link control such as channel coding, has been studied for such high speed packet transmission, for example, as proposed in "Symbol Rate and Modulation Level-Controlled Adaptive Modulation/TDMA/TDD system for High-Bit-Rate Wireless Data Transmission", T. Ue, S. Sampei, and N. Morinaga: IEEE Transactions VT, pp. 1134-1147, Vol. 47, no. 4, November 1988).

In adaptive modulation and channel coding based on adaptive radio link control, the data modulation level, spreading factor (SF), the number of multi-codes, and the channel coding rate are switched over according to the propagation environment of a user in order to conduct high speed data transmission-efficiently. For example, as for data modulation, the quadrature phase shift keying (QPSK) modulation used in the current W-CDMA is switched over to a multi-level modulation having a higher efficiency, such as 8 PSK modulation, 16 quadrature amplitude modulation (QAM), or 64 QAM, as the propagation environment becomes favorable. As a result, the maximum throughput of the communication system can be increased.

As for the high speed packet transmission, application of the automatic repeat request (ARQ) technique proposed in "Automatic-Repeat-Request Error Control Schemes", (S. Lin, D. Costello, Jr., and M. Miller: IEEE Communications Magazine. Vol. 12, no. 12, pp. 5-17, December 1984) has also been studied.

The high-speed packet channel used for such high-speed packet transmission is a shared channel. The shared channel is used by a plurality of mobile stations. Therefore, the transmission power of the shared channel becomes significantly larger than that of the dedicated physical channel. The dedicated physical channel is a dedicated channel for each mobile station.

Accordingly, in SSDT method, where it is always only the most appropriate base station that is transmitting data, interference with other cells or sectors can be reduced in comparison with a soft handover where there is a plurality of base stations performing data transmission simultaneously. As a result, with high-speed packet transmission, application of the SSDT method is studied in order to improve data throughput in the end of cells and sectors, and enlarge the range capable of achieving target data throughput value.

However, in high-speed packet transmission that uses the high-speed packet channel, each base station assigns the high-speed packet channel to a plurality of mobile stations. The high speed packet channel is a shared channel. Therefore, an opportunity of communication using a high-speed packet channel is assigned only to one, or a few mobile stations at any point in time.

Accordingly, even if the most appropriate base station is selected based on the received power or signal to interference power ratio of the received signal, and the cell or sector covered by the most appropriate base station is selected as well, the opportunity of communication is not always assigned to the mobile station in that cell or sector upon receiving assignment of the high speed packet channel. In particular, when there is a large traffic load in the selected cells or sectors, the opportunity of communication assigned to the mobile station in that cell or sector becomes significantly limited. In other words, the frequency with which the base station grants the opportunity of communication to mobile stations drops. In addition, throughput of the mobile station to which the opportunity of communication is not assigned drops. Furthermore, since the base station selects a cell or sector for a plurality of mobile stations based on the received power and signal to interference power ratio in the mobile station, control load in the base station increases. Therefore, the efficiency with which the base station performs control in order to communicate with the mobile stations also drops. As a result, in particular, data throughput performed by the mobile stations located at the end of the cells or sectors drops. Accordingly, the range capable of achieving the target data throughput value cannot be enlarged.

SUMMARY OF THE INVENTION

An object of the present invention is to improve throughput of communication performed by the mobile stations located at the end of the communication area, and to enlarge the range capable of achieving the target data throughput value.

A mobile station according to an aspect of the present invention comprises a reception unit configured to receive a signal transmitted from a base station; a selection unit configured to select a communication area to perform communication from a plurality of communication areas based on traffic load in the plurality of communication areas where the reception unit can receive the signal; and a notification unit configured to notify the base station of the communication area selected by the selection unit.

The communication area means a radio area covered by the base station. The communication area is an area where the mobile station performs communication with the base station by transmitting/receiving a signal with the base station. The units of the communication area are: a "cell" that is a radio area covered by a single base station, and a "sector" that is obtained through further dividing the cell. The traffic load in the communication area means the amount of communication performed in the communication area. The traffic load may be represented by using indexes, such as, the number of mobile stations that perform communication with the base station in the communication area, the data volume transmitted/received between the base station and mobile station that is represented by a utilization rate of a channel for performing data transmission/reception, set between the base station and mobile station, the data volume that is held in the base station and which is to be transmitted to the mobile station, and the number of mobile stations which are transmission destination of the data held in the base station.

With such as the mobile station, the mobile station can detect the communication area capable of receiving a signal when the reception unit receives a signal from the base station. The selection unit then selects the communication area for performing communication from the communication areas based on the traffic load in a plurality of communication areas. Therefore, the mobile station may select the communication area to which the opportunity of communication is easily assigned in consideration of the traffic load in the communication area as the communication area for performing communication. Furthermore, the notification unit notifies the base station of the selected communication area. Therefore, the base station may control communication with the mobile station by using the notified communication area. In other words, there is no need for the base station to select the communication area for a plurality of mobile stations, and the control load of the base station can be distributed to the mobile station. Accordingly, it is possible to improve control efficiency for communication of the base station with the mobile station.

As a result, it is possible to increase the opportunity of communication assigned to the mobile station by the base station. Also, control efficiency of the base station may be improved. As a result, it is possible for the mobile station to increase data throughput performed by the mobile station located at the end of the communication area. It is possible for the mobile station to enlarge the range capable of achieving the target data throughput value.

A mobile station according to another aspect of the present invention comprises a reception unit configured to receive a signal transmitted from a base station; a calculation unit configured to calculate a ratio of an average reception quality value over a short period to an average reception quality value over a period longer than the short period as a reception quality of a received signal received by the reception unit; and a selection unit configured to select a communication area to perform communication from a plurality of communication areas where the reception unit can receive the signal, based on the ratio calculated by the calculation unit.

With such as the mobile station, the calculation unit calculates a ratio of the average reception quality value over a short period to the average reception quality value over a period longer than the short period as the reception quality of received signal. The selection unit then selects the communication area by using the ratio. The base station selects the mobile station to perform communication, and assigns a channel to the selected mobile station. The base station selects the mobile station to which a channel is assigned based on the ratio of the average reception quality value over a short period to the average reception quality value over a period longer than the short period. Accordingly, the selection unit selects the communication area by using the same criterion as the criterion of the channel assignment. Accordingly, the mobile station may select the communication area to which a channel is easily to be assigned, and the opportunity of communication is easily assigned.

As a result, it is possible for the mobile station to increase the opportunity of communication assigned to the mobile station by the base station. As a result, it is possible for the mobile station to increase data throughput performed by the mobile station located on the end of the communication area. It is possible for the mobile station to enlarge the range capable of achieving the target data throughput value.

BRIEF DESCRIPTION OF THE DRAWINGS

FIG. 5 is a flowchart illustrating a procedure for a communication method in the case of selecting a communication area based on the traffic load included in a control signal according to the embodiment of the present invention;

FIG. 6 is a flowchart illustrating a procedure for a communication method in the case of selecting a communication area by estimating the traffic load according to the embodiment of the present invention;

FIG. 7 is a flowchart illustrating a procedure for a communication method in the case of selecting a communication area based on the traffic load and reception quality according to the embodiment of the present invention;

FIG. 8 is a flowchart illustrating a procedure for communication method in the case of performing the directional beam transmission of a high speed packet channel according to the embodiment of the present invention;

FIG. 9 is a flowchart illustrating a procedure for a communication method in the case of performing scheduling using a channel assignment algorithm according to the embodiment of the present invention;

FIG. 10 is a flowchart illustrating a procedure for a communication method in the case of performing the directional beam transmission of a high speed packet channel, and performing scheduling using a channel assignment algorithm according to the embodiment of the present invention;

FIG. 11 is a flowchart illustrating a procedure for a communication method in the case of performing scheduling using a channel assignment algorithm, and selecting a communication area based on the traffic load in the communication area according to the embodiment of the present invention;

FIG. 13 is a block diagram illustrating a procedure for a communication method according to the modified example of the present invention.

DETAILED DESCRIPTION OF THE PREFERRED EMBODIMENTS

Figure 1:
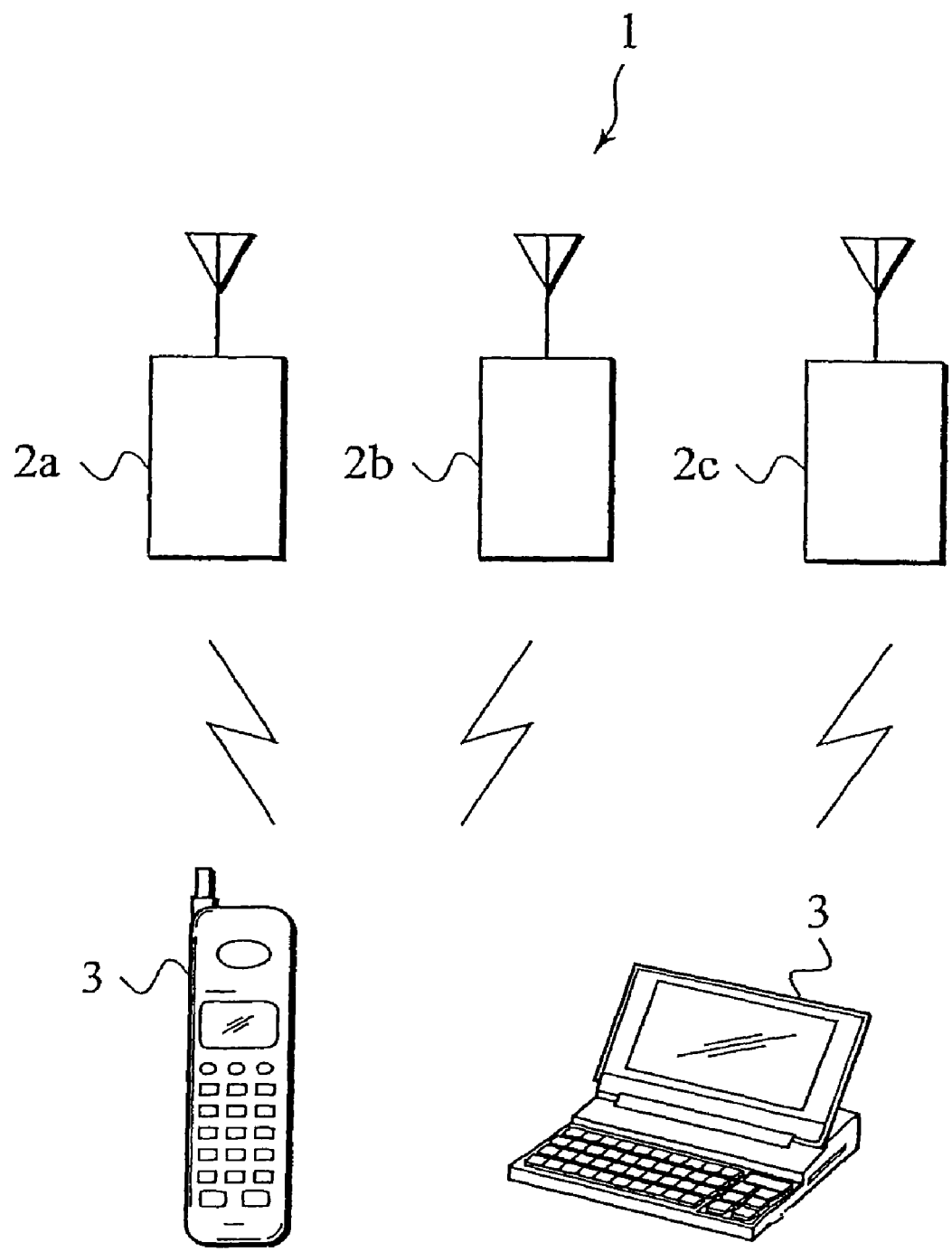
FIG. 1 is a diagram illustrating a communication system according to an embodiment of the present invention.

Referring now to the drawings, wherein like reference numerals designate identical or corresponding parts throughout the several views.

[Communication System]

An embodiment of the present invention will be described with reference to the drawings. As shown in FIG. 1, a communication system 1 includes a plurality of base stations 2a, 2b, and 2c, and a plurality of mobile stations 3. The base stations 2a through 2c and mobile stations 3 transmit/receive data and communicate with each other.

(Base Station)

Figure 2:
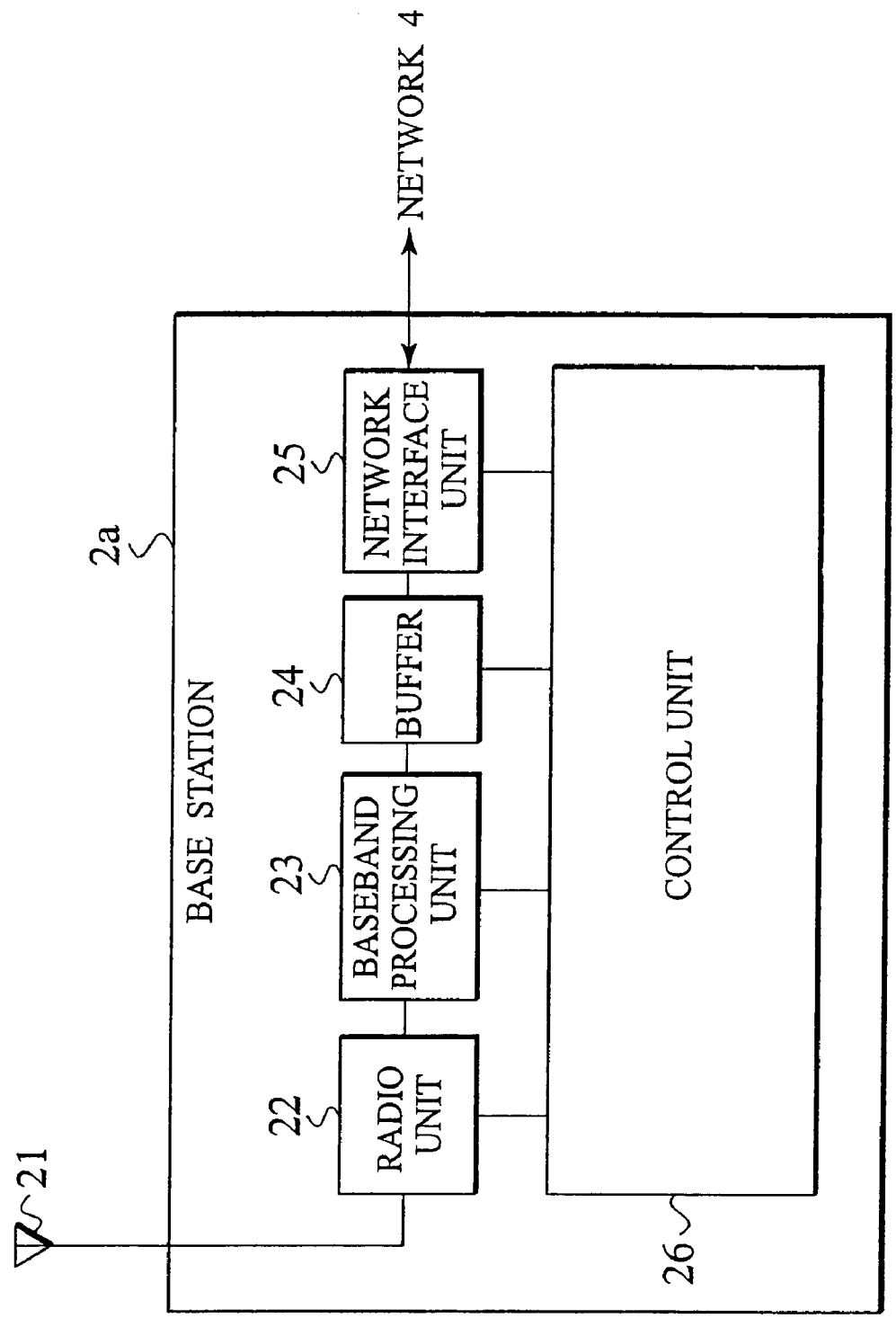
FIG. 2 is a block diagram illustrating a configuration of a base station according to the embodiment of the present invention.

As shown in FIG. 2, the base station 2a includes an antenna 21, a radio unit 22, a baseband processing unit 23, a buffer 24, a network interface unit 25, and a control unit 26. The base stations 2b and 2c are substantially the same as the base station 2a. The base stations 2a through 2c perform communication with a mobile station 3.

The antenna 21 transmits a packet and control signal input from the radio unit 22 to a mobile station 3. The antenna 21 inputs the packet and control signal received from the mobile station 3 to the radio unit 22. The radio unit 22 transmits the packet and control signal input from the baseband processing unit 23 to the mobile station 3 via the antenna 21. The radio unit 22 receives the packet and control signal transmitted from the mobile station 3 via the antenna 21 and inputs these to the baseband processing unit 23.

The radio unit 22 also functions as a transmission unit that transmits a control signal including the traffic load in the communication area covered by the base station 2a to the mobile station 3 through a control channel. The radio unit 22 transmits control information to the mobile station 3 through a downlink control channel. The downlink control channel is used to transmit a control signal, which includes control information from the base stations 2a through 2c to the mobile station 3. The downlink control channel includes a downlink common control channel, a downlink shared control channel, and a common pilot channel. The radio unit 22 also transmits data to the mobile stations 3 through the high speed packet channel.

The downlink common control channel is a channel that is used to transmit a control signal including common control information to a plurality of mobile stations 3. Therefore, the downlink common control channel is common to a plurality of mobile stations 3, and is effective for transmitting the traffic load in a communication area, that is information that does not change for each mobile station 3. Accordingly, the radio unit 22 preferably transmits the traffic load in the communication area covered by the base stations 2a through the downlink common control channel.

The downlink shared control channel is a channel that transmits a control signal shared by a plurality of mobile stations 3. Therefore, each mobile station 3 is able to obtain control information transmitted through the downlink shared control channel. As a result, the downlink shared control channel is effective for transmitting the traffic load in the communication area required for all of the mobile stations 3. Accordingly, the radio unit 22 preferably transmits the traffic load in the communication area covered by the base stations 2a through the downlink shared control channel. Note that the radio unit 22 transmits the traffic load in the communication area to the mobile station 3 in accordance with the control by the control unit 26 through the control channel, such as the downlink common control channel or downlink shared control channel.

The common pilot channel is a specific channel for transmitting a common pilot signal to each mobile station 3. The pilot signal is used when the mobile station 3 performs channel estimation, and is a known signal in the mobile station 3. The high speed packet channel is a channel, which is used to transmit a packet including data from the base stations 2a through 2c to the mobile station 3. The high speed packet channel is a downlink shared channel, which is shared by a plurality of mobile stations 3. Note that the radio unit 22 transmits a packet to the mobile station 3 through the high speed packet channel in accordance with the channel assignment by the control unit 26.

Note that directional beam transmission may be performed to transmit a packet to a predetermined direction when the radio unit 22 transmits a packet through a high speed packet channel. In this case, two kinds of common pilot channels—a primary common pilot channel and a secondary common pilot channel—are used as the common pilot channel. The primary common pilot channel is performed non-directional beam transmission of a pilot signal. The secondary common pilot channel is performed directional beam transmission of a pilot signal.

The radio unit 22 also functions as a reception unit that receives a control signal transmitted from the mobile station 3 via the uplink channel. The control signal transmitted from the mobile station 3 includes data that indicates the communication area selected by the mobile station 3. The data indicating the communication areas includes identification data specific to the base stations 2a through 2c, which can identify the base stations 2a through 2c that cover the communication area, and identification data specific to the communication area, which can identify the communication area such as the cell or sector. The identification data for the base stations 2a through 2c includes addresses of the base stations 2a through 2c, and base station IDs. The identification data for the communication area includes cell IDs and sector IDs.

The radio unit 22 receives a packet including data and a control signal, which includes control information from the mobile stations 3 via the uplink channel. The uplink channel is the channel that is used to transmit a control signal and a packet from the mobile stations 3 to the base stations 2a through 2c. The uplink channel includes a dedicated channel that is individually used by each mobile station 3 and a shared channel shared by a plurality of mobile stations 3. Furthermore, the dedicated channel includes a dedicated physical data channel, and a dedicated physical control channel. The shared channel and dedicated physical data channel are used for transmitting the control signal and packet. The dedicated physical control channel is used for transmitting the control signal.

The baseband processing unit 23 performs signal processing for a packet and a control signal to be transmitted to the mobile station 3, and inputs them to the radio unit 22. For example, the baseband processing unit 23 performs signal processing, such as channel coding, data modulation, and spreading modulation, on the packet and control signal. The baseband processing unit 23 obtains the packet from the buffer 24. The control signal is input from the control unit 26 to the baseband processing unit 23. The baseband processing unit 23 also performs signal processing for the packet and control signal received by the radio unit 22. For example, the baseband processing unit 23 performs signal processing, such as channel decoding, data demodulation, and despreading, on the packet and control signal. The baseband processing unit 23 stores the received packet in the buffer 24. In addition, the baseband processing unit 23 inputs the received control signal to the control unit 26.

The buffer 24 holds a packet to be transmitted to the mobile station 3 and the packet transmitted from the mobile station 3. The network interface unit 25 obtains from the buffer 24 the packet transmitted from the mobile station 3. The network interface unit 25 transmits that packet via the network 4. The network interface unit 25 obtains the packet to be transmitted to the mobile stations 3 via the network 4. The network interface unit 25 stores that packet in the buffer 24.

The control unit 26 controls the radio unit 22, baseband processing unit 23, and network interface unit 25. The control unit 26 instructs the radio unit 22 to transmit the traffic load in the communication area through a control channel, such as a downlink common control channel or downlink shared control channel. More specifically, the control unit 26 generates a control signal, which includes the traffic load. The control unit 26 then inputs the generated control signal to the baseband processing unit 23. The radio unit 22 obtains the control signal generated by the control unit 26 from the baseband processing unit 23. And the radio unit 22 transmits that control signal through the control channel, such as the downlink common control channel or downlink shared control channel.

The control unit 26 generates a control signal including, for example, the number of mobile stations 3 performing communication with the base station 2a in the communication area, the utilization rate of the high speed packet channel, which is the data volume transmitted/received between the base station 2a and the mobile station 3, the total number of packets to be transmitted to the mobile station 3, which are held in the buffer 24 by the base station 2a, and the number of mobile stations 3 which are transmission destinations of packets held in the buffer 24 by the base station 2a, as the traffic load.

The number of mobile stations 3 performing communication with the base station 2a in the communication area is the number of mobile stations 3 connected to the radio unit 22. The utilization rate of the high speed packet channel is the utilization rate of the high speed packet channel to be transmitted by the radio unit 22. Therefore, these are known in the radio unit 22. Accordingly, the radio unit 22 inputs to the control unit 26 the number of mobile stations 3 connected to the radio unit 22 and the utilization rate of the high speed packet channel to be transmitted by the radio unit 22. The control unit 26 then generates the control signal including the number of mobile stations 3 and the utilization rate of the high speed packet channel input from the radio unit 22, as the traffic load.

The control unit 26 references the buffer 24, and obtains the total number of packets to be transmitted to the mobile stations 3 held in the buffer 24 by the base stations 2a, and the number of mobile stations 3 which are the transmission destinations of the packet. The control unit 26 generates the control signal including the obtained total number of packets and the number of mobile stations 3 which are the transmission destinations of the packets, and the traffic load.

The control unit 26 also controls to communicate with the mobile station 3 in the communication area selected by the mobile station 3. A control signal is input to the control unit 26 from the baseband processing unit 23. As a result, the control unit 26 obtains the control signal received by the radio unit 22 from the mobile station 3 via the baseband processing unit 23. The control unit 26 obtains data from the control signal, which indicates the communication area selected by the mobile station 3 included in that control signal. The control unit 26 controls the baseband processing unit 23 and radio unit 22 to transmit the packet to the mobile station 3 via the high speed packet channel, when the data indicating the communication area indicates the communication area that is covered by that base station 2a.

More specifically, the control unit 26 assigns the high speed packet channel for packet transmission to that mobile station 3. The control unit 26 inputs the result of the high speed packet channel assignment to the radio unit 22, and instructs the radio unit 22 to transmit the packet in accordance with the channel assignment. The control unit 26 instructs the baseband processing unit 23 to obtain the packet to the mobile station 3 from the buffer 24, perform signal processing, and input the packet to the radio unit 22. The baseband processing unit 23 then performs signal processing of the packet to the mobile stations 3 and inputs the packet to the radio unit 22. The radio unit 22 transmits the packet to the mobile stations 3 through the high speed packet channel in accordance with the channel assignment instructed by the control unit 26. Note that the control unit 26 also assigns the uplink channel for packet transmission from the mobile station 3 to the base stations 2a.

Meanwhile, the control unit 26 determines not to transmit the packet to the mobile station 3 when the data indicating the communication area does not indicate the communication area covered by the base station 2a. In this case, the control unit 26 performs no specific operation toward the baseband processing unit 23 and radio unit 22.

(Mobile Station)

Figure 3:
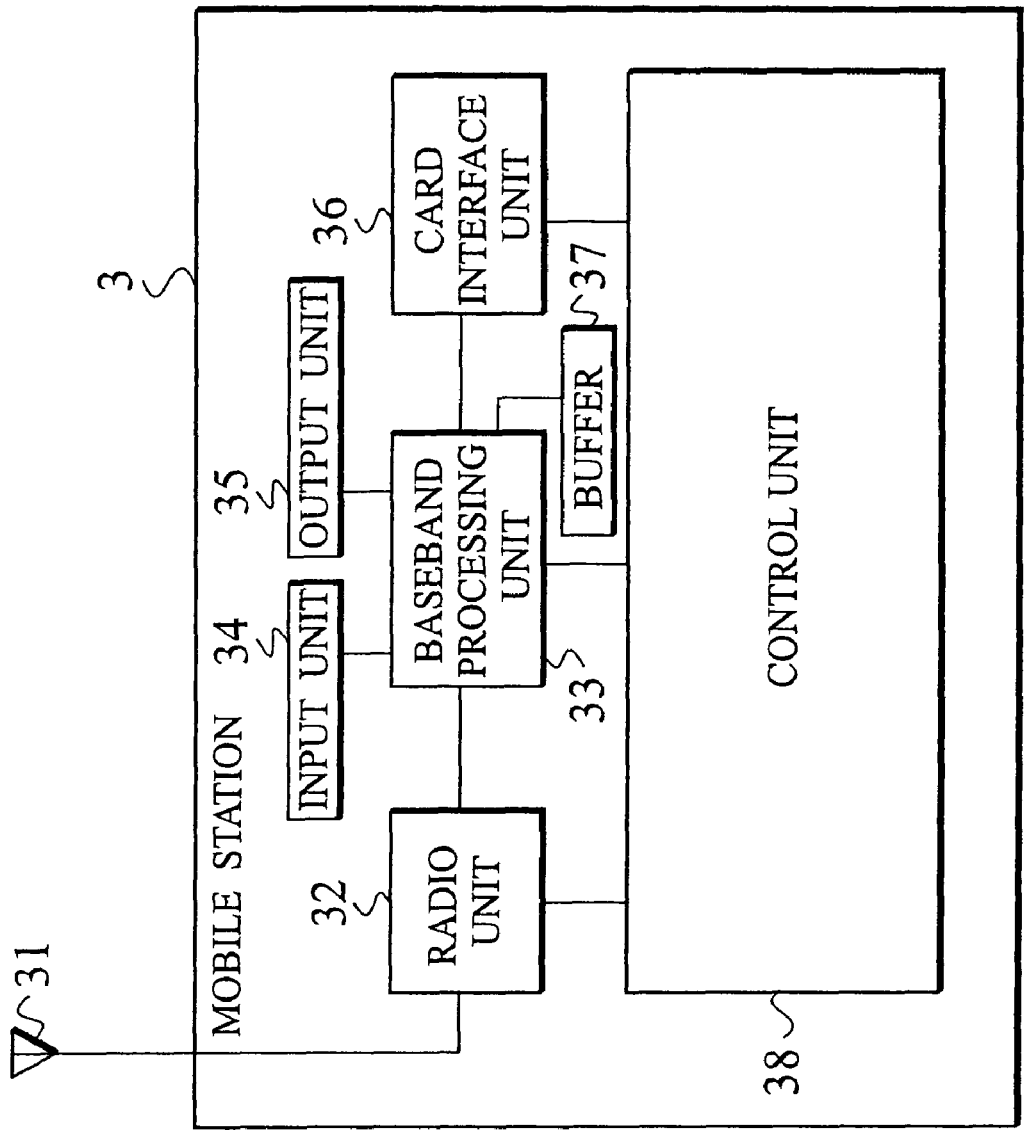
FIG. 3 is a block diagram illustrating a configuration of a mobile station according to the embodiment of the present invention.

As shown in FIG. 3, the mobile station 3 includes an antenna 31, a radio unit 32, a baseband processing unit 33, an input unit 34, an output unit 35, a card interface unit 36, a buffer 37, and a control unit 38. The mobile station 3 communicates with the base stations 2a through 2c in the communication area, such as cells or sectors, covered by the base stations 2a through 2c.

The antenna 31 transmits a packet and control signal input from the radio unit 32 to the base stations 2a through 2c. The antenna 31 receives the packet and control signal from the base stations 2a through 2c and inputs them to the radio unit 32. The radio unit 32 transmits the packet and control signal input from the baseband processing unit 33 to the base stations 2a through 2c via the antenna 31.

The radio unit 32 functions as a notification unit that notifies the base stations 2a through 2c, of a communication area to perform communication, which is selected by the mobile station 3. More specifically, the radio unit 32 notifies of data that indicates the selected communication area, through an uplink channel such as a dedicated channel or shared channel. The radio unit 32 transmits, for example, a control signal including the address of the base stations 2a through 2c, base station ID, cell ID, or sector ID to the base stations 2a through 2c. The radio unit 32 multiplexes the control signal including data that indicates the communication area, with the packet including other control signals and data in the uplink channel, and then transmits them. Time multiplexing or code multiplexing may be used to multiplex the control signal. In accordance with the control unit 38, the radio unit 32 notifies the base stations 2a through 2c that the data indicates the selected communication area. Note that the radio unit 32 transmits a packet, which includes data to the base stations 2a through 2c through the shared channel or the dedicated physical data channel.

The radio unit 32 functions as a reception unit that receives a control signal and a signal including a packet transmitted from the base stations 2a through 2c via the antenna 31. The radio unit 32 inputs the received signal to the baseband processing unit 33. The radio unit 32 receives the control signal including the traffic load via the downlink common control channel or downlink shared control channel. The radio unit 32 also receives a pilot signal through the common pilot channel. The radio unit 32 receives a packet including data through the high speed packet channel. The radio unit 32 measures the received power when the control channel and high speed packet channel transmitted from the base stations 2a through 2c are received, and inputs the received power to the control unit 38.

The baseband processing unit 33 obtains data to be transmitted to the base stations 2a through 2c from the input unit 34 and card interface unit 36. The baseband processing unit 33 generates a packet including the obtained data. The baseband processing unit 33 performs signal processing on the generated packet and control signal, and inputs them to the radio unit 32. For example, the baseband processing unit 33 performs signal processing, such as channel coding, data modulation, and spreading modulation, for the packet and control signal. The baseband processing unit 33 stores the generated packet in the buffer 37, and obtains the packet from the buffer 37 for transmission. The control signal is input from the control unit 38 to the baseband processing unit 33.

The baseband processing unit 33 also performs signal processing on the packet and control signal received by the radio unit 32 from the base stations 2a through 2c. For example, the baseband processing unit 33 performs signal processing, such as channel decoding, data demodulation, and despreading, for the received data packet and control signal. The baseband processing unit 33 outputs the data included in the received packet to the output unit 35. The baseband processing unit 33 inputs the data included in the received packet to the card interface unit 36. In addition, the baseband processing unit 33 inputs the received control signal to the control unit 38.

The input unit 34 inputs data to be transmitted from the mobile station 3 to the baseband processing unit 33. The data received by the mobile station 3 is input to the output unit 35 from the baseband processing unit 33, and the output unit 35 outputs the data. The card interface unit 36 obtains data to be transmitted from the mobile station 3 from an external device, such as a personal computer, via a specific data transmission card, such as a PC card. The card interface unit 36 inputs the obtained data to the baseband processing unit 33. The data received by the mobile station 3 is input to the card interface unit 36 from the baseband processing unit 33. The card interface unit 36 inputs data received by the mobile stations 3 to the external device via the card. The buffer 37 holds the packet to be transmitted to the base stations 2a through 2c.

The control unit 38 controls the radio unit 32 and baseband processing unit 33. The control unit 38 functions as a selection unit that selects the communication area where the mobile station 3 performs communication. The control unit 38 selects the communication area to perform communication based on the traffic load in a plurality of communication areas. For example, the control unit 38 selects a communication area with the least traffic load as the communication area to perform communication.

The control unit 38 may detect, for example, the traffic load in each communication area through the following method. A control signal is input to the control unit 38 from the baseband processing unit 33. As a result, the control unit 38 obtains a control signal, which is received by the radio unit 32 via the baseband processing unit 33. The control unit 38 may detect the traffic load by obtaining the traffic load in each communication area included in the control signal. The control unit 38 obtains as the traffic load in the communication area, for example, the number of mobile stations 3 performing communication with the base stations 2a through 2c in each communication area, the utilization rate of the high speed packet channel, the total number of packets to be transmitted to the mobile stations 3 are held by the base stations 2a through 2c, and the number of mobile stations 3 which are transmission destinations of packets held by the base stations 2a through 2c. Accordingly the control unit 38 may select the communication area based on the traffic load included in the control signal.

Figure 4A:
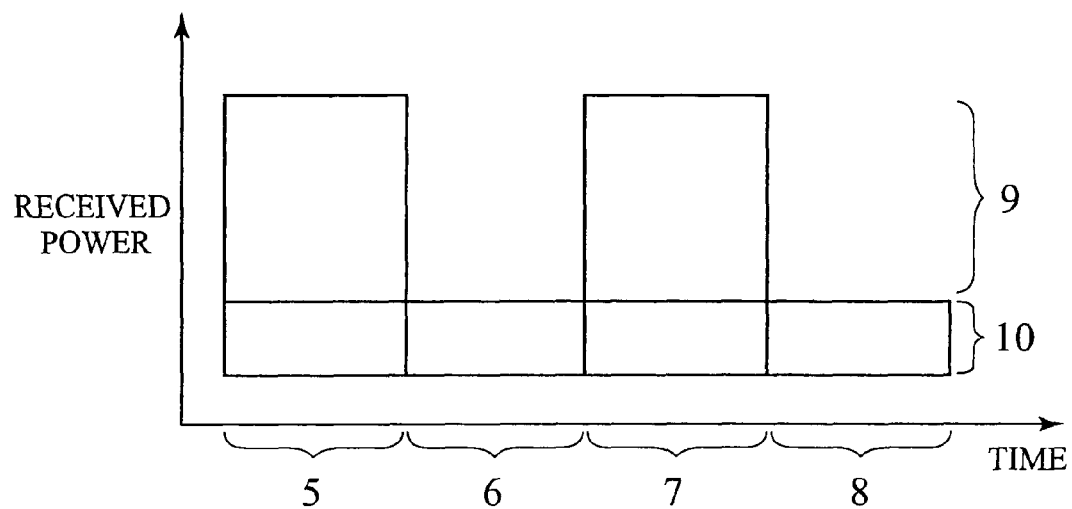
FIGS. 4A and 4B are graphs illustrating the received power of a received signal according to the embodiment of the present invention.
Figure 4B:
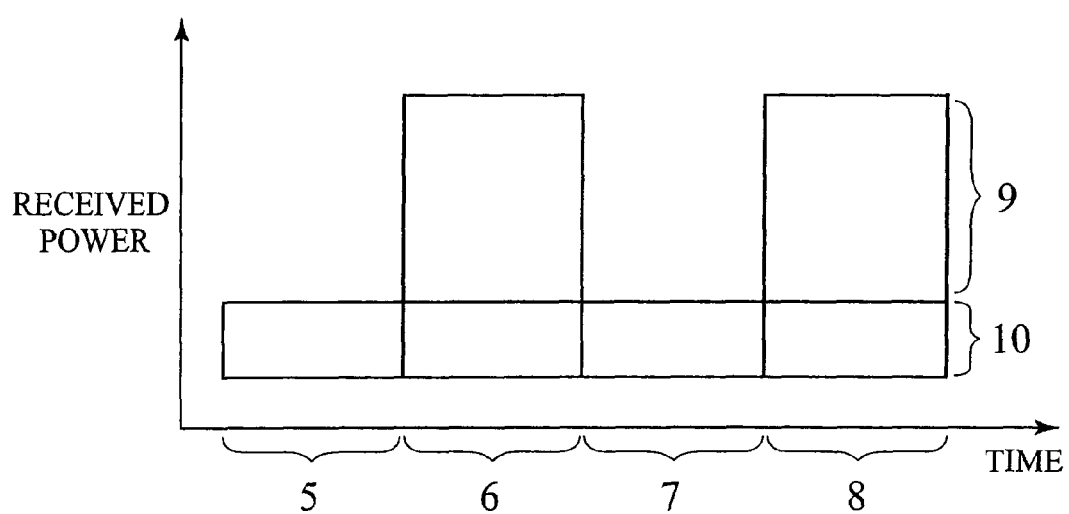

The control unit 38 also functions as an estimation unit that estimates the traffic load in the plurality of communication areas based on the received power of the signal received by the radio unit 32. The signal is transmitted from the base stations 2a through 2c. The high speed packet channel that transmits a packet including data, and a plurality of control channels that transmit a control signal including control information are transmitted from the base stations 2a through 2c. FIG. 4A illustrates received power when the radio unit 32 receives the channel transmitted from the base station 2a. FIG. 4B illustrates received power when the radio unit 32 receives the channel transmitted from the base station 2b. In FIGS. 4A and 4B, the vertical axis indicates the received power received by the mobile stations 3, and the horizontal axis indicates time.

The radio units 22 of the base stations 2a and 2b transmit the high speed packet channel at an extremely high transmission power. The radio units 22 transmit the control channel at a low transmission power. Therefore, when there are not packets to be transmitted in the base stations 2a and 2b, and the traffic load in the communication areas covered by these base stations 2a and 2b is little, the radio unit 22 does not transmit the high speed packet channel. Therefore, the radio unit 32 of the mobile stations 3 receives only the control channel transmitted at the low transmission power. Accordingly, the received power of the channel received by the mobile stations 3 is only the received power 10, when the control channel is received, and it becomes low.

Meanwhile, when there are packets to be transmitted in the base stations 2a and 2b, and the traffic load in the communication areas covered by these base stations 2a and 2b is large, the radio unit 22 transmits the high speed packet channel. Therefore, the radio unit 32 of the mobile station 3 receives the control channel transmitted at the low transmission power and the high speed packet channel transmitted at the high transmission power. Accordingly, the received power of the channel received by the mobile station 3 is found by adding the received power 10 when the control channel is received and the received power 9 when the high speed channel is received, and it becomes extremely high.

Therefore, the control unit 38 may obtain the received power when the channel is received from the radio unit 32, and estimate the traffic load in the communication area by using that received power. More specifically, since it seems that no high speed packet channel is transmitted when the received power is low, the control unit 38 may estimate that the traffic load in the communication area is little. Meanwhile, since it seems that high speed packet channel is transmitted when the received power is high, the control unit 38 may estimate that the traffic load in the communication area is large.

Alternatively, the control unit 38 calculates the ratio of the received power when the common pilot channel is received included in the received power 10 when the control channel is received, and the received power when other channel (channel other than the common pilot channel) is received. The ratio of the high received power 9 when the high speed packet channel is received and the low received power when the pilot channel is received may be large. Therefore, the control unit 38 determines that no high speed packet channel is included in the channel other than the pilot channel when the ratio of the received power when the common pilot channel is received, and the received power when the other channel is received is small. The control unit 38 then estimates that the traffic load in the communication area is little.

Meanwhile, the control unit 38 determines that the high speed packet channel is included in the channel other than the pilot channel when the ratio of the received power when the common pilot channel is received and the received power when the other channel is received is large. The control unit 38 then estimates that the traffic load in the communication area is large.

In the case of FIG. 4A, at times 5 and 7, since the received power of the mobile station 3 becomes the total of the received power 10 when the control channel is received plus the received power 9 when the high speed channel is received, so it is very large. In addition, the ratio of the received power when the common pilot channel is received that is included in the received power 10 when the control channel is received, and the received power when the channel other than the common pilot channel is received including the received power 9 when the high speed packet channel is received is also large. Therefore, the control unit 38 is able to estimate that the traffic load in the communication area covered by the base station 2a is large.

Meanwhile, in the case of FIG. 4B, at times 5 and 7, the received power when the mobile stations 3 receive the channel from the base station 2b is only the received power 10 when the control channel is received, so it is small. In addition, the ratio of the received power when the common pilot channel is received included in the received power 10 when the control channel is received and the received power when the channel other than the common pilot channel included in the received power 10 is also small. Therefore, the control unit 38 is able to estimate that the traffic load in the communication area covered by the base station 2b is little. Accordingly, at times 5 and 7, the control unit 38 is able to select a communication area of the base station 2b where the traffic load is estimated as little, as the communication area for performing communication.

Conversely, at times 6 and 8 (see FIG. 4A), the control unit 38 is able to estimate that the traffic load in the communication area covered by the base station 2a is little. The control unit 38 is then able to select a communication area in the base station 2a where the traffic load is estimated as little, as the communication area for performing communication.

In this manner, the control unit 38 of the mobile station 3 is able to estimate the traffic load in a plurality of communication areas based on the received power of a signal received by the radio unit 32. The control unit 38 is then able to select the communication area based on the estimated traffic load. Therefore, the mobile station 3 is able to estimate the traffic load and select the communication area without using the control signal. Accordingly, the control load of the base stations 2a through 2c may be further reduced. In addition, radio resources are not consumed for transmitting the control signal. Therefore, the radio resources may be utilized for data transmission. As a result, the throughput of the communication performed by the mobile station 3 further increases.

The control unit 38 may select the communication area for performing communication based on the reception quality of the received signal received by the radio unit 32 in addition to the traffic load in the communication area. For example, the control unit 38 finds the reception quality of the common pilot channel received by the radio unit 32. More specifically, the control unit 38 obtains the received power when the common pilot channel is received, from the radio unit 32. The control unit 38 then finds the reception quality, such as the received power of the pilot signal, and the signal to interference power ratio of the pilot signal based on the received power. Note that the reception quality found may be the received power or signal to interference power ratio at any point in time, or it may be an average of the received power and signal to interference power ratio.

The control unit 38 holds the predetermined threshold value of the reception quality from the most preferable reception quality. The control unit 38 selects from the communication areas that have the most preferable reception quality to the communication areas that have a reception quality within the threshold value as communication area candidates for performing communication. The control unit 38 selects the communication area with the least traffic load in the communication area from the selected communication area candidates.

Alternatively, the control unit 38 may hold the predetermined threshold value of the traffic load from the least traffic load. In this case, the control unit 38 selects from the communication area with the least traffic load to the communication area with the traffic load within the threshold value as communication area candidates for performing communication. The control unit 38 selects the communication area that has the most preferable reception quality in the communication area from the selected communication area candidates.

In this manner, the control unit 38 may select the communication area in consideration of not only the traffic load in the communication area but also the reception quality. For example, the control unit 38 may select the communication area with little traffic load from the communication areas that have some degree of reception quality. The control unit 38 may also select the communication area that has a preferable reception quality from the communication areas that have little traffic load, to some degree. Therefore, the mobile station 3 may select a communication area where the traffic load is little, an opportunity of communication can be easily assigned, and the reception quality is preferable. Accordingly, both the opportunity of communication assigned to the mobile stations 3 from the base stations 2a through 2c and the probability that the mobile station 3 has a successful data transmission/reception may be improved. As a result, the throughput of the communication performed by the mobile station 3 may be further improved.

Note that when the radio unit 22 of the base stations 2a through 2c performs directional beam transmission for transmitting packets through the high speed packet channel, two kinds of common pilot channels, that is, the primary common pilot channel and secondary common pilot channel, are used. The primary common pilot channel is performed non-directional beam transmission. Therefore, the reception quality found by using the primary common pilot channel does not match with the reception quality of the high speed packet channel that is performed directional beam transmission. Accordingly, the reception quality found by using the primary common pilot channel is not preferable as the reception quality to be used in selecting the communication area for performing communication.

Meanwhile, the secondary common pilot channel is performed directional beam transmission in the same direction as the high speed packet channel. Accordingly, the reception quality found by using the secondary common pilot channel matches with the reception quality of the high speed packet channel that is performed directional beam transmission. Therefore, the control unit 38 preferably selects the communication area for performing communication by using the reception quality found based on the secondary common pilot channel. As a result, it is possible to select the communication area based on the reception quality in consideration of the fact that the high speed packet channel is performed directional beam transmission.

The control unit 26 of the base stations 2a through 2c assigns a channel for packet transmission from the base stations 2a through 2c to the mobile station 3, and for packet transmission from the mobile station 3 to the base stations 2a through 2c. The channel assignment method includes a method of using a channel assignment algorithm that selects the mobile station 3 with the largest ratio of the average reception quality value of the mobile station 3 over a short period to the average reception quality value of the mobile station 3 over a period longer than the short period. This channel assignment method is called "proportional fairness scheduling" (see "Data Throughput of CDMA-HDR a High Efficiency-High Data Rate Personal Communication Wireless System", A. Jalali, R. Padovani, R. Pankaj: Proc. of IEEE VTC2000—Spring, pp. 1854-1858, May 2000).

When the control unit 26 of the base stations 2a through 2c uses proportional fairness scheduling for channel assignment, the control unit 38 may select the communication area for performing communication based on the ratio of the average reception quality value of a signal received by the radio unit 32 over a short period to the average reception quality value over a period longer than the short period. In this case, the control unit 38 also functions as a calculating unit that calculates the ratio of the average reception quality value over a short period to the average reception quality value over a period longer than that short period as the reception quality of a signal received by the radio unit 32.

The control unit 38 calculates, for example, the ratio of the average reception quality value over the short period to the average reception quality value over the long period as the reception quality of the common pilot channel received by the radio unit 32. More specifically, the control unit 38 obtains the received power with which the common pilot channel is received from the radio unit 32. The control unit 38 then finds the reception quality, such as the received power of the received pilot signal and signal to interference power ratio of the received pilot signal, based on that received power. The control unit 38 calculates the average reception quality value over the short period to the average reception quality value over the long period, and calculates the ratio thereof based on the found reception quality. The control unit 38 then selects the communication area with the highest ratio as the communication area for performing communication.

Note that in the case where the radio unit 22 of the base stations 2a through 2c performs directional beam transmission to transmit a packet using a high speed packet channel, it is preferable that the average reception quality value be calculated using the secondary common pilot channel that is performed to directional beam transmission in the same direction as the high speed packet channel, and then the ratio of the two (the average reception quality value over a short period to the average reception quality value over a long period) be calculated. Accordingly, it is possible to select the communication area for performing communication based on the reception quality in consideration of the fact that the high speed packet channel is performed to directional beam transmission.

The control unit 38 may also select the communication area in consideration of the traffic load in the communication area even when selecting the communication area based on the ratio of the average reception quality value over a short period to the average reception quality value over a long period. For example, the control unit 38 holds the predetermined threshold value of the ratio found from the largest value of the ratio of the average reception quality value over a short period to the average reception quality value over a long period of a signal. The control unit 38 selects candidate communication areas for performing communication from the communication area with the largest ratio found to the communication area having the value of the ratio within the threshold value. The control unit 38 selects the communication area with the least traffic load in the communication area from the selected communication area candidates.

Alternatively, the control unit 38 may hold a predetermined traffic load threshold value from the lowest traffic load. In this case, the control unit 38 selects candidate communication areas for performing communication, from the communication area with the least traffic load to the communication area with a traffic load within the threshold value. The control unit 38 selects from the selected communication area candidates, the communication area where the ratio of the average reception quality over a short period to the average reception quality value over a long period is the largest.

The control unit 38 generates a control signal including data indicating the selected communication area. The control unit 38 instructs the radio unit 32 to transmit the control signal including data indicating the selected communication area through an uplink channel, such as a common channel or dedicated channel. More specifically, the control unit 38 generates a control signal including data indicating the selected communication area, and inputs the control signal to the baseband processing unit 33. The radio unit 32 obtains the control signal generated by the control unit 38 via the baseband processing unit 33. The radio unit 32 multiplexes that control signal in the uplink channel (common channel or dedicated channel) and transmits them to the base stations 2a through 2c.

[Communication Method]

Next, a communication method using such a communication system 1 is described. Although omitted from FIG. 5 through FIG. 11, the base station 2c performs substantially the same operation as the base stations 2a and 2b. In FIG. 5 through FIG. 11, the case where a cell is the unit of communication area is described as an example.

To begin with, a communication method where the mobile station 3 selects the communication area based on the traffic load in the communication area included in the control signal transmitted through the control channel from the base stations 2a and 2b is described using FIG. 5. As shown in this figure, the radio units 22 of the base stations 2a and 2b transmit the control signal including the traffic load of the cells respectively covered by the base stations 2a and 2b, to the mobile station 3 (S101). The base stations 2a and 2b transmit the control signal using a downlink common control channel or downlink shared control channel.

The radio unit 32 of the mobile station 3 receives the control signal including the traffic load transmitted from the base stations 2a and 2b, respectively (S102). The mobile station 3 receives the control signal through the downlink common control channel or downlink shared control channel. The control unit 38 of the mobile station 3 obtains the control signal, which is received by the radio unit 32 via the baseband processing unit 33. The control unit 38 obtains the traffic load in each cell from the control signal. The control unit 38 then selects a cell with the least traffic load as the cell for performing communication. In this case, since the unit of communication area is a cell, the mobile station 3 selects the base station that covers the selected cell (S103). The control unit 38 of the mobile station 3 generates a control signal including the identification data of the selected base station. The radio unit 32 of the mobile station 3 multiplexes the control signal in the uplink channel, and transmits the control signal to the respective base stations 2a through 2c (S104).

In the base stations 2a and 2b, the radio units 22 receive the control signal including the identification data of the base station selected by the mobile station 3, respectively. The radio unit 22 receives the control signal transmitted from the mobile stations 3 through the uplink channel. The baseband processing unit 23 then demodulates data (S105). The control units 26 of respective base stations 2a and 2b determine whether the identification data included in the control signal indicates its own base station. In other words, whether a cell covered by base station 2a or 2b has been indicated is determined (S106).

In step (S106), the control units 26 of the respective base stations 2a and 2b decide to transmit a packet when the identification data of the base station included in the control signal indicates its own base station. The control unit 26 assigns the high speed packet channel for packet transmission to the mobile station 3. The radio unit 22 then transmits the packet (S107).

Meanwhile, in step (S106), the control units 26 of the respective base stations 2a and 2b decide not to transmit a packet when the identification data of the base station included in the control signal does not indicate its own base station (S108). In this manner, the packet is transmitted only from the base station, which covers the cell selected by the mobile station 3.

Next, the case where the mobile station 3 estimates the traffic load in the communication area and selects the communication area is described. As shown in FIG. 6, to begin with, the radio units 22 of the base stations 2a and 2b transmit a channel such as a downlink control channel or high speed packet channel to the mobile station 3 (S201).

The radio unit 32 of the mobile station 3 measures the received power of the channel received from each of the base stations 2a and 2b, and inputs the result to the control unit 38. Alternatively, the control unit 38 calculates the ratio of the received power when the common pilot channel is received and the received power when other channel (a channel other than the common pilot channel) is received, based on the received power input by the radio unit 32 (S202).

For a cell with a low received power, or a cell where the ratio of the received power when the common pilot channel is received and the received power when the other channel is received is small, the control unit 38 estimates that the traffic load of that cell is little. The control unit 38 then selects the cell where the traffic load is estimated as little, as the cell for performing communication. In this case, since the communication area unit is a cell, the mobile station 3 selects the base station that covers the selected cell (S203). Step (S204) through step (S208) are substantially the same as step (S104) through step (S108) shown in FIG. 5.

Next, the case where the mobile station 3 selects the communication area based on the traffic load in the communication area and the reception quality of the signal is described. To begin with, as shown in FIG. 7, the radio units 22 of the base stations 2a and 2b transmit the control signal including the traffic load of a cell respectively covered by the base stations 2a and 2b to the mobile station 3 (S301). The radio unit 22 transmits the control signal through a downlink common control channel or downlink shared control channel. The radio units 22 of the base stations 2a and 2b also transmit the pilot signal to the mobile station 3 through the common pilot channel (S302).

The radio unit 32 of the mobile station 3 receives the common pilot channel from the base stations 2a and 2b, respectively. The radio unit 32 measures the received power of the received common pilot channel, and inputs the result to the control unit 38. The control unit 38 finds the reception quality, such as the received power, or signal to interference power ratio in the cell covered by each of the base stations 2a and 2b, by using the pilot signal transmitted through the common pilot channel (S303). The control unit 38 selects the base station candidates to cover the cell performing communication, from the base station that covers the cell that has the most preferable reception quality, to the base station that covers the cell that has a reception quality that is within the threshold value (S304). The control unit 38 selects the cell with the least traffic load included in the control signal transmitted in step (S301) from the selected base station candidates. In this case, since the communication area unit is a cell, the mobile station 3 selects the base station covering the selected cell (S305). Step (S306) through step (S310) are substantially the same as step (S104) through step (S108) shown in FIG. 5.

Next, the case where the mobile station 3 selects the communication area based on the traffic load in the communication area and the reception quality of the signal when the base station performs directional beam transmission is described. To begin with, as shown in FIG. 8, the radio units 22 of the base stations 2a and 2b transmit the control signal including the traffic load of a cell to the mobile station 3 (S401). The radio units 22 of the base stations 2a and 2b also transmit the pilot signal to the mobile station 3 through the primary common pilot channel and secondary common pilot channel (S402).

The radio unit 32 of the mobile station 3 receives the primary common pilot channel and secondary common pilot channel from the respective base stations 2a and 2b. The radio unit 32 measures the received power of the secondary common pilot channel performed directional beam transmission, and inputs the result to the control unit 38. The control unit 38 finds the reception quality, such as the received power or the signal to interference power ratio, by using the pilot signal transmitted through the secondary common pilot channel from the respective base stations 2*a* and 2*b* (403). The control unit 38 selects the base station candidates to cover the cell performing communication, from the base station that covers the cell that has the most preferable reception quality to the base station that covers the cell that has reception quality found by using the secondary common pilot channel within the threshold value (S404). Step (S405) through step (S410) are substantially the same as step (S305) through step (S310) shown in FIG. 7.

Next, the case where the base stations 2*a* and 2*b* perform proportional fairness scheduling using a channel assignment algorithm is described. To begin with, as shown in FIG. 9, the radio units 22 of the base stations 2*a* and 2*b* transmit the pilot signal to the mobile stations 3 through the common pilot channel (S501). The radio unit 32 of the mobile station 3 receives the common pilot channel from the respective base stations 2*a* and 2*b*. The radio unit 32 measures the received power of the received common pilot channel, and inputs the result to the control unit 38. The control unit 38 finds the reception quality, such as the received power or signal to interference power ratio, by using the pilot signal transmitted through the common pilot channel from the respective base stations 2*a* and 2*b* (S502).

The control unit 38 finds the average reception quality value over a short period (S503), and finds the average reception quality value over a period longer than the short period (S504), based on the found reception quality. The control unit 38 calculates the ratio of the average reception quality value over a short period to the average reception quality value over a long period, found in steps (S503) and (S504). The control unit 38 selects the cell with the largest ratio. In this case, since the communication area unit is a cell, the mobile station 3 selects the base station that covers the selected cell (S505). Step (S506) through step (S510) are substantially the same as step (S104) through step (S108) shown in FIG. 5.

Next, the case where the base stations 2*a* and 2*b* perform directional beam transmission of the high speed packet channel and perform proportional fairness scheduling is described. To begin with, as shown in FIG. 10, the radio units of the base stations 2*a* and 2*b* transmit the pilot signal to the mobile station 3 through the primary common pilot channel and secondary common pilot channel (S601). The radio unit 32 of the mobile station 3 receives the primary common pilot channel and secondary common pilot channel from the respective base stations 2*a* and 2*b*. The radio unit 32 measures the received power of the secondary common pilot channel performed directional beam transmission as with the high speed packet channel, and inputs the result to the control unit 38. The control unit 38 finds the reception quality, such as the received power or the signal to interference power ratio, by using the pilot signal transmitted through the secondary common pilot channel from the respective base stations 2*a* and 2*b* (S602).

The control unit 38 finds the average reception quality value over a short period (S603), and finds the average reception quality value over a period longer than the short period (S604), based on the reception quality found by using the secondary common pilot channel. The control unit 38 calculates the ratio of the average reception quality value over a short period to the average reception quality value over a long period of the secondary common pilot channel found in steps (S603) and (S604). The control unit 38 then selects the cell with the largest ratio. In this case, since the communication area unit is a cell, the mobile station 3 selects the base station that covers the selected cell (S605). Step (S606) through (S610) are substantially the same as step (S104) through step (S108) shown in FIG. 5.

Next, the case where the mobile station 3 selects the communication area in consideration of the traffic load in the communication area when the base stations 2*a* and 2*b* perform proportional fairness scheduling is described. To begin with, as shown in FIG. 11, the radio units 22 of the base stations 2*a* and 2*b* transmit the control signal including the traffic load of the cell covered by each of the base stations 2*a* through 2*c* to the mobile station 3 through the downlink common control channel or downlink shared control channel (S701). The radio units 22 of the base stations 2*a* and 2*b* also transmit the pilot signal to the mobile station 3 through the common pilot channel (S702).

The radio unit 32 of the mobile station 3 receives the control signal including the traffic load. The control unit 38 of the mobile station 3 obtains the traffic load in each cell from the control signal. The control unit 38 then selects base station candidates to cover the cell performing communication from the base station that covers the cell with the least traffic load, to the base station that covers cell with a traffic load within the threshold value (S703). The radio unit 32 measures the received power of the common pilot channel received from the base station for the base station candidates selected by the control unit 38, and inputs the result to the control unit 38. The control unit 38 finds the reception quality, such as the received power or signal to interference power ratio in the cell covered by each base station candidate, by using the pilot signal transmitted through the common pilot channel (S704).

The control unit 38 finds the average reception quality value over a short period (S705), and finds the average reception quality value over a long period (S706), based on the reception quality found for the cell covered by the base station candidates. The control unit 38 calculates the ratio of the average reception quality value over a short period to the average reception quality value over a long period for the cell covered by the base station candidates found in steps (S705) and (S706). The control unit 38 selects the cell with the largest ratio. In this case, since the communication area unit of is a cell, the mobile station 3 selects the base station that covers the selected cell (S707). Step (S708) through step (S712) are substantially the same as step (S104) through step (S108) shown in FIG. 5.

With such as the communication system 1, the base stations 2*a* through 2*c*, the mobile station 3, and the communication method, the mobile station 3 is able to detect the communication areas capable of receiving a signal, by the radio unit 32 in the mobile station 3 receives a signal transmitted from the radio units 22 of base stations 2*a* through 2*c*. The control unit 38 then selects the communication area for performing communication from those communication areas based on the traffic load in that plurality of communication areas. Therefore, the mobile station 3 can select a communication area in which an opportunity of communication is easily assigned in consideration of the traffic load in that communication area. Furthermore, traffic load can be distributed among the respective communication areas. The radio unit 32 notifies the base stations 2*a* through 2*c* of the control signal including the communication area for communication selected by the control unit 38, by multiplexing the signal in the uplink channel and transmitting the control signal to the base stations 2*a* through 2*c*. Therefore, the control units 26 of the base stations 2*a* through 2*c* may control to communicate with the mobile station 3 in the communication area notified. In this manner, it is not necessary for the base stations 2*a* through 2*c* to select for the plurality of mobile stations 3, the communication area where each mobile station 3 is to perform communication. Accordingly, the control load in the base stations 2*a* through 2*c* may be distributed to the mobile station 3. As a result, it is possible to improve the control efficiency for communication of the base stations 2a through 2c with the mobile station 3.

Therefore, it is possible to increase the opportunity of communication that can be assigned to the mobile station 3 by the base stations 2a through 2c. In other words, it is possible to increase the service throughput of the base stations 2a through 2c. In addition, the opportunity of communication for mobile station 3 in the communication area increases. The control efficiency of the base stations 2a through 2c is also improved. As a result, it is possible to increase the data throughput performed by the mobile stations 3 located in the end of the communication area. Accordingly, the range capable of achieving the target data throughput, that is, the cell coverage, can be enlarged.

Furthermore, the radio units 22 of the base stations 2a through 2c can transmit the control signal including the traffic load in the communication area to the mobile station 3 through the downlink common control channel or downlink shared control channel. In this case, the radio unit 32 of the mobile stations 3 receives a control signal including the traffic load in the communication area, which is transmitted from the base stations 2a through 2c. Therefore, the control unit 38 of the mobile station 3 may select the communication area for performing communication based on the traffic load included in the control signal. In other words, the mobile station 3 can utilize the traffic load transmitted from the base stations 2a through 2c, therefore, there is no need for the mobile station 3 itself to calculate the traffic load. Therefore, the control load in the mobile station 3 may be distributed to the base stations 2a through 2c. Meanwhile, control units 26 of the base stations 2a through 2c control to communicate with the mobile station 3 in the communication area selected by the mobile station 3 based on traffic load. Accordingly, there is no need for the base stations 2a through 2c to select the communication area for a plurality of mobile stations 3, and the control load of the base stations 2a through 2c may be distributed to the mobile station 3. Accordingly, it is possible to improve the control efficiency of the base stations 2a through 2c, and to improve the efficiency with which the mobile station 3 selects the communication area as well. As a result, it is possible to further improve data throughput.

When the control units 26 of the base stations 2a through 2c perform proportional fairness scheduling, that is, the control unit 26 assigns a channel for the mobile station 3 with the largest ratio of the average reception quality value over a short period to the average reception quality value over a long period, the control unit 38 selects the communication area based on the ratio of the average reception quality value over a short period to the average reception quality value over a long period of the signal received by the radio unit 32. As a result, the control unit 38 may select the communication area for performing communication using the same criterion as the criterion for channel assignment.

Accordingly, the control unit 38 may select the communication area in which a channel is easily assigned, and the opportunity of communication is easily assigned. As a result, it is possible to increase the opportunity on which the base stations 2a through 2c can assign the high speed packet channel for packet transmission to the mobile station 3. Therefore, it is possible to increase the opportunity of communication assigned to the mobile stations 3 by the base stations 2a through 2c. As a result, it is possible to increase the data throughput performed by the mobile stations 3 located at the end of the communication area. Accordingly, cell coverage may be enlarged. Furthermore, the mobile station 3 calculates the ratio of the average reception quality value over a short period to the average reception quality value over a long period, and then selects the communication area. Therefore, since it is possible to distribute the control load of the base stations 2a through 2c to the mobile station 3, and thereby improve the control efficiency of the base stations 2a through 2c. It is possible to further increase the data throughput performed by the mobile station 3.

Modified Example

Figure 12:
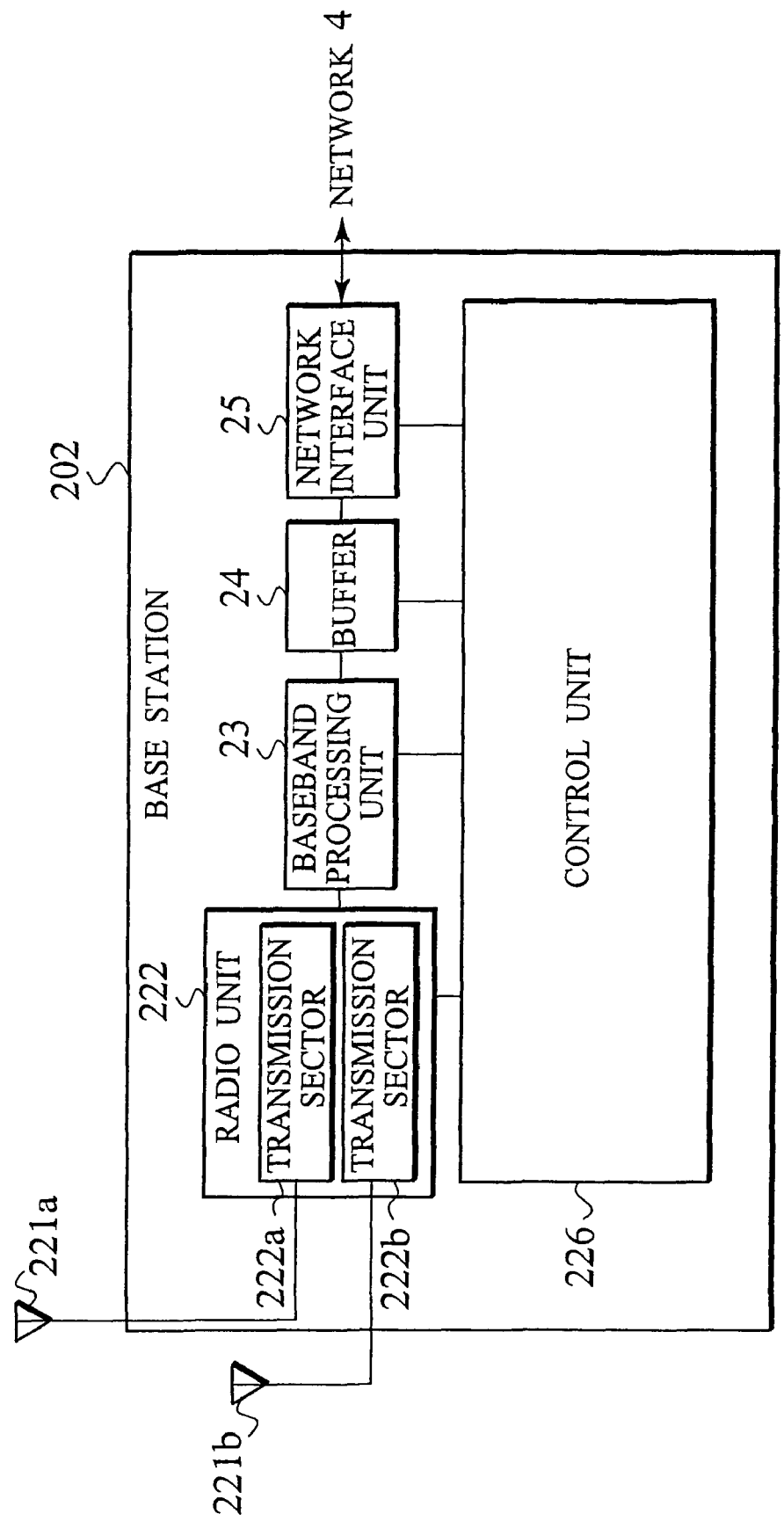
FIG. 12 is a block diagram illustrating a configuration of a base station according to a modified example of the present invention.

The present invention is not limited to the above mentioned embodiment, and various changes are possible. The case where a sector is used as the communication area unit, and the sector is selected as the communication area for performing communication is described. As shown in FIG. 12, the base station 202 includes antennas 221a and 221b, a radio unit 222, a baseband processing unit 23, a buffer 24, a network interface unit 25, and a control unit 226. Since the baseband processing unit 23, buffer 24, and network interface unit 25 are substantially the same as those in FIG. 2, a repetitive description is omitted by denoting the same reference numerals.

The radio unit 222 transmits/receives data and control signal by sector. Therefore, the radio unit 222 includes a plurality of transmission sectors 222a and 222b that function as a transmission unit that transmits data and a control signal to a mobile station 3 located in each sector and a reception unit that receives the data and control signal from the mobile stations 3 located in each sector. The antennas 221a and 221b transmit a packet and control signal input from the transmission sectors 222a and 222b to a mobile station 3. The antennas 221a and 221b input the packet and control signal received from the mobile station 3 to transmission sectors 222a and 222b. The transmission sectors 222a and 222b transmit the packet and control signal input from the baseband processing unit 23 to the mobile station 3 via the antennas 221a and 221b. The transmission sectors 222a and 222b receive the packet and control signal transmitted from the mobile station 3 via the antennas 221a and 221b, and input these to the baseband processing unit 23.

The transmission sectors 222a and 222b cover respective sectors. In FIG. 12, only two transmission sectors 222a and 222b are shown, however, they are formed for the number of sectors that are obtained when the cell covered by the base station 202 is divided. The transmission sectors 222a and 222b receive an instruction from the control unit 226 to transmit a packet to the mobile station 3. More specifically, the transmission sectors 222a and 222b receive an instruction from the control unit 226 to turn the packet transmission function on. The transmission sectors 222a and 222b then transmit the packet. Meanwhile, the transmission sectors 222a and 222b receive an instruction from the control unit 226 not to transmit the packet to the mobile stations 3. More specifically, the transmission sectors 222a and 222b receive an instruction from the control unit 226 to turn the packet transmission function off. The transmission sectors 222a and 222b, accordingly, do not transmit a packet.

The transmission sectors 222a and 222b carry out substantially the same function as the radio unit shown in FIG. 2 except for performing transmission of the downlink control channel and high speed packet channel by sector. The control unit 226 controls by sector. More specifically, the control unit 226 generates a control signal including the traffic load in the communication area by sector. The control unit 226 also controls to communicate with the mobile station 3 in the sector selected by the mobile station 3. The control unit 226 is substantially the same as the control unit 26 shown in FIG. 2 except for performing control by sector.

More specifically, the control unit 226 obtains data indicating the communication area selected by the mobile stations 3 from the control signal transmitted from the mobile station 3. The control unit 226 instructs the transmission sectors 222a and 222b that cover the sector corresponding to the obtained data to transmit the packet to the mobile station 3. In other words, the control unit 226 instructs the transmission sectors 222a and 222b to turn the packet transmission function on.

Meanwhile, the control unit 226 instructs the transmission sectors 222a and 222b that cover the sector, which is not corresponding to the obtained data not to transmit a packet to the mobile station 3. In other words, the control unit 226 instructs the transmission sectors 222a and 222b to turn the packet transmission function off. In this manner, the control unit 226 controls to communicate with the mobile station 3 in the communication area selected by sector.

Next, a communication method is described. In FIG. 13, procedures performed by components other than the transmission sectors 222a and 222b, such as the control unit 226 and baseband unit 23 of the base station 202 are shown as procedures of the base station 202. In particular, the procedures performed by the transmission sectors 222a and 222b are shown as the procedures in the transmission sectors 222a and 222b.

To begin with, as shown in FIG. 13, the transmission sectors 222a and 222b transmit a control signal including the traffic load of the respective sectors covered by the transmission sectors 222a and 222b to the mobile station 3 through the downlink common control channel or downlink shared control channel (S801). The respective transmission sectors 222a and 222b also transmit the pilot signal to the mobile station 3 through the common pilot channel (S802).

The radio unit 32 of the mobile station 3 receives the common pilot channel from the respective transmission sectors 222a and 222b. The radio unit 32 measures the received power of the received common pilot channel, and inputs the result to the control unit 38. The control unit 38 finds the reception quality, such as the received power or signal to interference power ratio, by using the pilot signal transmitted through the common pilot channel from the respective transmission sectors 222a and 222b (S803). The control unit 38 selects the transmission sectors 222a and 222b that cover the sector with reception quality within the threshold value, from the transmission sectors 222a and 222b that cover the sector that has the most preferable reception quality as the transmission sector candidates to cover the sector for performing communication (S804). The control unit 38 selects the sector with the least traffic load included in the control signal transmitted in step (S801) from the selected transmission sector candidates. In this case, since the communication area unit is a sector, the mobile station 3 selects the transmission sector 222a or 222b that covers the selected sector (S805).

The control unit 38 of the mobile station 3 generates the control signal including the sector ID of the sector covered by the selected transmission sector 222a or 222b. The radio unit 32 multiplexes the control signal in the uplink channel, and transmits the control signal to the base station 202 (S806). In the base station 202, the radio unit 222 receives a control signal including the sector ID selected by the mobile station 3, which is transmitted from the mobile station 3 through the uplink channel. The baseband processing unit 23 then demodulates data (S807). The control unit 226 of the base station 202 instructs the transmission sector 222a or 222b which covers the sector corresponding to the sector ID included in the control signal to turn the packet transmission function on. The control unit 226 instructs the transmission sector 222a or 222b which covers the sector not corresponding to the sector ID included in the control signal to turn the packet transmission function off (S808).

The respective transmission sectors 222a and 222b determine whether the instruction to transmit the packet is received from the control unit 226 (S809). The transmission sector 222a or 222b transmits the packet (S810) when receiving the instruction to transmit the packet in step (S809). Meanwhile, the transmission sector 222a or 222b does not transmit the packet (S811) when receiving the instruction not to transmit the packet in step (S809).

In this manner, even when the communication area unit is a sector, the mobile station 3 may select the communication area for which opportunity of communication is easily assigned, as the communication area for performing communication. Accordingly, the base station 202 can increase service throughput. The opportunity for a mobile station 3 to perform communication in the communication area increases. As a result, it is possible to increase the data throughput performed by the mobile station 3 located in the end of the communication area.

Note that in the communication method shown in FIG. 13 the sector is selected based on the traffic load in the sector included in the control signal and the reception quality in the sector, however, the sector may be selected by estimating the traffic load in the sector, or based on the ratio of the average reception quality value over a short period to the average reception quality value over a long period.

In FIG. 9 through FIG. 11, the mobile stations 3 select the communication area when the base stations 2a through 2c perform proportional fairness scheduling as the channel assignment method, however, the base stations 2a through 2c may select the communication area. In this case, the control unit 38 of the mobile stations 3 generates a control signal including reception quality information related to the reception quality, such as the received power or signal to interference power ratio found based on the received pilot signal. The control unit 38 instructs the radio unit 32 to transmit the control signal to the base stations 2a through 2c. The radio unit 32 then transmits the control signal including the reception quality information to the base stations 2a through 2c. The radio unit 22 of the base stations 2a through 2c receives the control signal including the reception quality information. The control unit 26 obtains the control signal from the radio unit 22 via the baseband processing unit 23.

The control unit 26 obtains the reception quality information included in the control signal. The control unit 26 then calculates the average reception quality value over a short period to the average reception quality value over a long period of the received signal received by the mobile stations 3, using the reception quality information. The control unit 26 then functions as a calculation unit to calculate the ratio thereof. The control unit 26 functions as a selection unit that selects the communication area with the largest ratio as the communication area where the mobile station 3 performs communication, based on the calculated ratio. The control unit 26 of the base stations 2a through 2c assigns the high speed packet channel for packet transmission to the mobile station 3 when the base station that covers the selected communication area is that base station itself. The radio unit 22 then transmits the packet. Meanwhile, the control units 26 of the other base stations 2a through 2c perform no operations when the base station that covers the selected communication area is not the other base station.

Furthermore, the communication area may be selected in consideration of the reception quality of the signal received by the mobile station 3 even in the case of a communication method that selects the communication area through estimation of the traffic load by the mobile station 3 as shown in FIG. 6. For example, the mobile station 3 may select the communication area with a small estimated traffic load from the communication areas where there is some degree of preferable reception quality. The control unit 3 may also select the communication area having preferable reception quality from communication areas where the estimated traffic load is somewhat little.

In the communication methods shown in FIG. 7, FIG. 8, and FIG. 12, the mobile station 3 selects the communication area candidates in consideration of the reception quality first, and selects the communication area with little traffic load from those candidates, however, the communication area candidates may be selected in consideration of the traffic load first, and then communication area with preferable reception quality may be selected from those candidates. Similarly, in the communication method shown in FIG. 11, the mobile station 3 selects communication area candidates for performing communication in consideration of the traffic load first, and then selects the communication area with large ratio from those candidates, however, the communication area candidates with a large ratios may be selected first, and the communication area with little traffic load may be then selected from those candidates.

The invention claimed is:

1. A mobile station comprising:
a reception unit configured to receive a signal transmitted from a base station;
an estimation unit configured to determine whether or not a high speed packet channel is included in the signal received by the reception unit, based on a ratio of a received power of a control channel and a received power of a channel other than the control channel in the signal received by the reception unit, and to estimate traffic load in each of a plurality of communication areas in which the reception unit can receive the signal, based on a result of the determination;
a measurement unit configured to obtain a reception quality of the signal received in each of a plurality of communication areas by the reception unit;
a selection unit configured to select a communication area to perform communication from the plurality of communication areas based on the traffic load estimated by the estimation unit and the reception quality obtained by the measurement unit; and
a notification unit configured to notify the base station of the communication area selected by the selection unit.

2. The mobile station of claim 1, further comprising:
a holding unit configured to hold a reception quality threshold value of a reception quality range from the most preferable reception quality,
wherein the selection unit is configured to select at least one communication area which has the obtained reception quality within the reception quality threshold value as a communication area candidate for performing communication, and to select a communication area with a least estimated traffic load from the communication area candidate as the communication area to perform the communication.

3. The mobile station of claim 1, further comprising:
a holding unit configured to hold a traffic load threshold value of a traffic load range from the least traffic load,
wherein the selection unit is configured to select at least one communication area which has the estimated traffic load within the traffic load threshold value as a communication area candidate for performing communication, and to select a communication area with a most preferable obtained reception quality from the communication area candidate as the communication area to perform the communication.

4. A communication system comprising:
a mobile station that includes:
a reception unit configured to receive signals transmitted from a base station,
an estimation unit configured to determine whether or not a high speed packet channel is included in a signal received by the reception unit, based on a ratio of a received power of a control channel and a received power of a channel other than the control channel in the signal received by the reception unit, and to estimate traffic load in each of a plurality of communication areas in which the reception unit can receive the signal, based on a result of the determination;
a measurement unit configured to obtain a reception quality of the signal received in each of a plurality of communication areas by the reception unit;
a selection unit configured to select a communication area to perform communication from the plurality of communication areas based on the traffic load estimated by the estimation unit and the reception quality obtained by the measurement unit;
a notification unit configured to notify a plurality of base stations of the communication area selected by the selection unit; and
the base station that includes a control unit configured to control to communicate with the mobile station in the communication area notified from the notification unit.

5. A communication method, comprising:
receiving, by a mobile station, a signal transmitted from a base station;
determining, by the mobile station, whether or not a high speed packet channel is included in the signal received by the reception unit, based on a ratio of a received power of a control channel and a received power of a channel other than the control channel in the signal received in the reception step;
estimating, by the mobile station, traffic load in each of a plurality of communication areas in which the mobile station can receive the signal in the reception step, based on a result of the determination;
obtaining, by the mobile station, a reception quality of the signal received in each of a plurality of communication areas in the reception step;
selecting by a mobile station, a communication area where the mobile station performs communication, from a plurality of communication areas, based on the traffic load estimated in the estimation step and the reception quality obtained in the obtaining step;
notifying the base station of the selected communication area; and
controlling by the base station, to communicate with the mobile station in the communication area notified from the mobile station.

* * * * *